United States Patent
Sin Xicola et al.

(10) Patent No.: US 11,614,134 B2
(45) Date of Patent: Mar. 28, 2023

(54) COATINGS FOR BRAKE DISCS, METHOD FOR REDUCING WEAR AND CORROSION AND ASSOCIATED BRAKE DISC

(71) Applicant: ITT Italia S.R.L., Milan (IT)

(72) Inventors: Agustin Sin Xicola, Milan (IT); Francesco Vannucci, Milan (IT); Simone Ansaloni, Milan (IT)

(73) Assignee: ITT Italia S.R.L., Milan (IT)

( * ) Notice: Subject to any disclaimer, the term of this patent is extended or adjusted under 35 U.S.C. 154(b) by 166 days.

(21) Appl. No.: 17/131,244

(22) Filed: Dec. 22, 2020

(65) Prior Publication Data

US 2022/0196092 A1 Jun. 23, 2022

(51) Int. Cl.
*F16D 65/12* (2006.01)
*F16D 65/00* (2006.01)

(52) U.S. Cl.
CPC ....... *F16D 65/125* (2013.01); *F16D 65/0025* (2013.01); *F16D 65/127* (2013.01); *F16D 2200/003* (2013.01); *F16D 2200/0013* (2013.01); *F16D 2200/0021* (2013.01); *F16D 2200/0052* (2013.01); *F16D 2250/0046* (2013.01)

(58) Field of Classification Search
CPC ........... F16D 65/12; F16D 65/123–128; F16D 65/092; F16D 69/027; F16D 55/22; F16D 2065/1304; F16D 2200/0013; F16D 2200/0017; F16D 2200/0021; F16D 2200/0065; F16D 2250/0046; B60T 1/065; B60T 1/067
USPC ......................................... 188/18 A, 218 XL
See application file for complete search history.

(56) References Cited

U.S. PATENT DOCUMENTS 4,290,510 A 9/1981 Warren
5,612,110 A * 3/1997 Watremez ............. F16D 69/027
428/614

(Continued)

FOREIGN PATENT DOCUMENTS

CN 111043203 A 4/2020
CN 114763816 A 7/2022
(Continued)

OTHER PUBLICATIONS

Azad A et al: Influence of HVOF parameters on the wear resistance of Cr3C2—NiCr coating Wear and corrosion performance View project11 , Journal of Materials Science & Surface Engineering, Jan. 1, 2016 (Jan. 1, 2016), pp. 355-359.

(Continued)

*Primary Examiner* — Christopher P Schwartz
(74) *Attorney, Agent, or Firm* — Mannava & Kang, P.C.

(57) ABSTRACT

Brake pads are prepared using a formulation of friction material of the copper-free type (Low-Steel or Organic Non-Asbestos) and at least one friction surface of a brake disc, which is intended to cooperate with the brake pad, is covered with an anti-wear and anti-corrosion coating consisting of a surface layer of chromium carbide particles (Cr3C2) dispersed in a metallic matrix consisting of a NiCr alloy, and coupled to a second layer consisting of selected combinations of metallic materials, chosen from the group consisting of: Cr3C2-high density NiCr, NiAl alloys, FeNi-CrMoSiC alloys, metallic nickel, NiCr alloys, and/or any combination of the above.

15 Claims, 36 Drawing Sheets

(56) References Cited

U.S. PATENT DOCUMENTS

| | | | | |
|---|---|---|---|---|
| 5,863,618 | A | * | 1/1999 | Jarosinski ............. C22C 1/1042 427/451 |
| 9,970,501 | B2 | * | 5/2018 | Hattori ................. F16D 69/026 |
| 10,399,144 | B2 | | 9/2019 | Cook, III |
| 2011/0042145 | A1 | * | 2/2011 | Xia ........................ E21B 10/52 76/108.1 |
| 2011/0254230 | A1 | | 10/2011 | Jarosinski et al. |
| 2011/0278116 | A1 | | 11/2011 | Lembach et al. |
| 2011/0293849 | A1 | * | 12/2011 | Lembach ............. F16D 65/127 148/284 |
| 2015/0354647 | A1 | | 12/2015 | Tironi et al. |
| 2017/0122392 | A1 | * | 5/2017 | Lembach ................ F16D 69/04 |
| 2020/0072307 | A1 | | 3/2020 | Rettig et al. |
| 2020/0217382 | A1 | | 7/2020 | Kuckert et al. |
| 2020/0378459 | A1 | * | 12/2020 | Carminati ............. F16D 65/125 |
| 2021/0293292 | A1 | * | 9/2021 | Rettig .................. F16D 65/127 |
| 2022/0065313 | A1 | * | 3/2022 | Carminati ............. F16D 65/127 |
| 2022/0196092 | A1 | | 6/2022 | Xicola et al. |
| 2022/0196098 | A1 | | 6/2022 | Xicola et al. |

FOREIGN PATENT DOCUMENTS

| | | | | |
|---|---|---|---|---|
| CN | 114836707 | A | | 8/2022 |
| DE | 102009050025 | A1 | * | 5/2011 ............. F16D 65/12 |
| DE | 102011056307 | A1 | | 6/2013 |
| DE | 102014015474 | A1 | | 4/2016 |
| DE | 102016200951 | A1 | | 7/2017 |
| EP | 0960954 | A2 | | 12/1999 |
| EP | 1258647 | A2 | | 11/2002 |
| EP | 3620546 | A2 | | 3/2020 |
| EP | 3620546 | A1 | | 4/2020 |
| EP | 4019659 | A1 | | 6/2022 |
| EP | 4019797 | A1 | | 6/2022 |
| WO | 2017046681 | A1 | | 3/2017 |
| WO | 2019020390 | A1 | | 1/2019 |
| WO | 2019021161 | A1 | | 1/2019 |
| WO | 2020128740 | A1 | | 6/2020 |

OTHER PUBLICATIONS

European Search Report App. No. EP20216486.9 dated May 19, 2021, pp. 8.

European Search Report App. No. EP20216490.1 dated May 18, 2021, pp. 8.

Federici Matteo et al: "Pin-on-disc study of a friction material dry sliding against HVOF coated discs at room temperature and 300 ° C.", Tribology International, Elsevier Ltd, Amsterdam, NL, vol. 115, May 22, 2017 (May 22, 2017), pp. 89-99.

Federici Matteo et al: "Sliding Behaviour of Friction Material Against Cermet Coatings: Pin-on-Disc Study of the Running-in Stage", Tribology Letters, Baltzer Science Publishiers, NL, vol. 66, No. 2, Feb. 22, 2018 (Feb. 22, 2018), pp. 1-11.

Search Report and Written Opinion for Application No. IT201900012171 dated May 4, 2020, pp. 12.

Notice of Allowance for U.S. Appl. No. 17/128,259 dated Nov. 23, 2022, pp. 11.

* cited by examiner

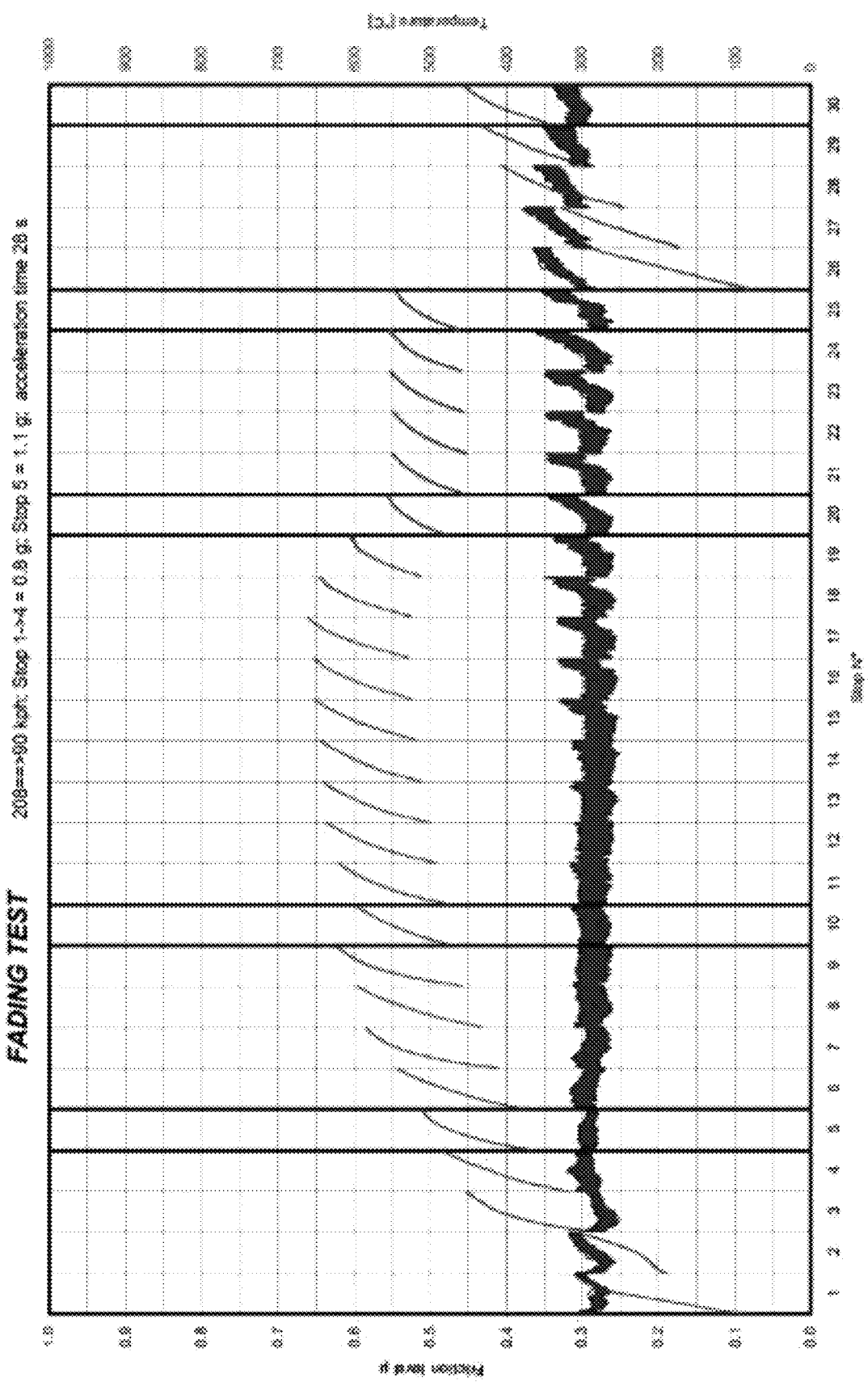

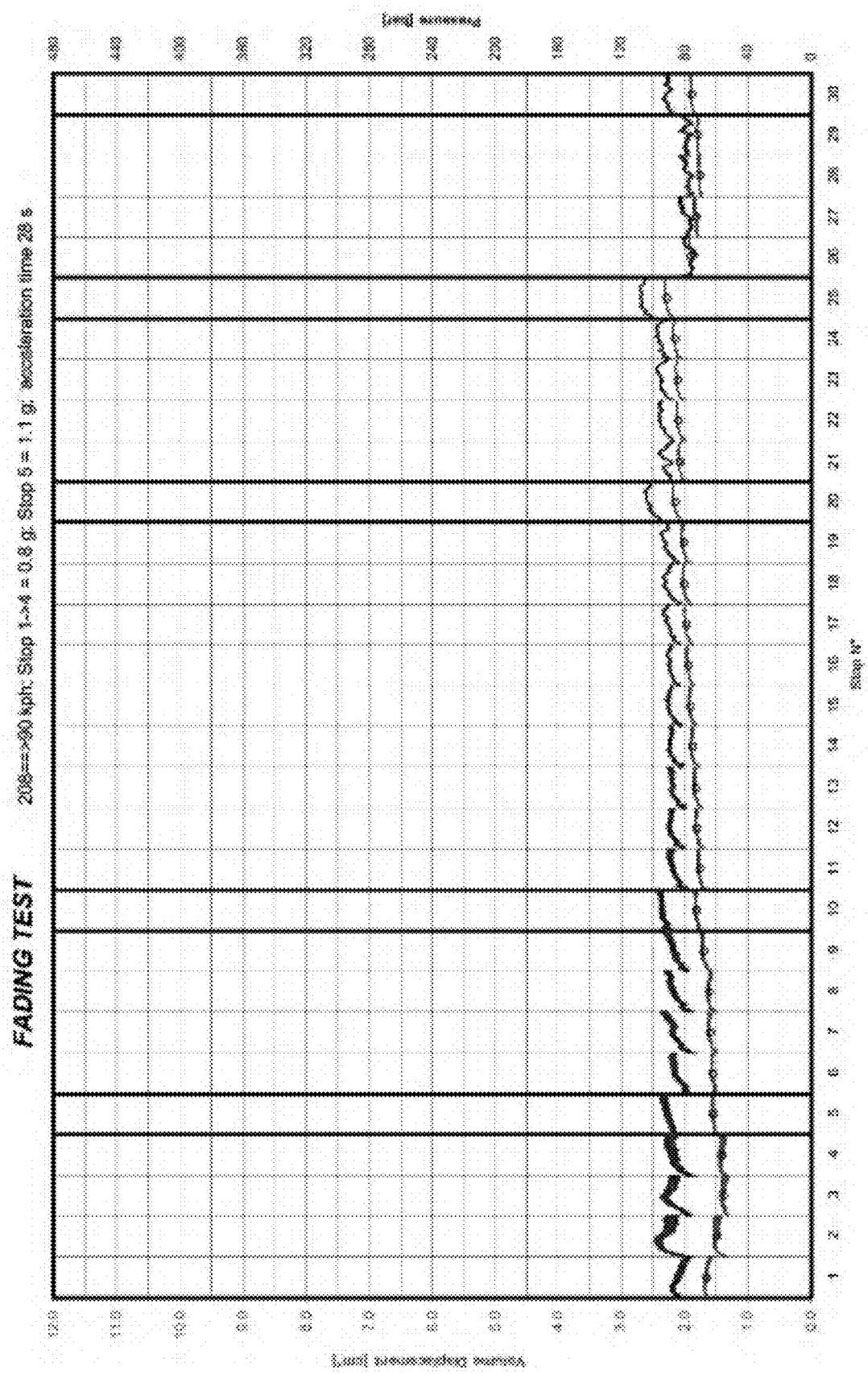

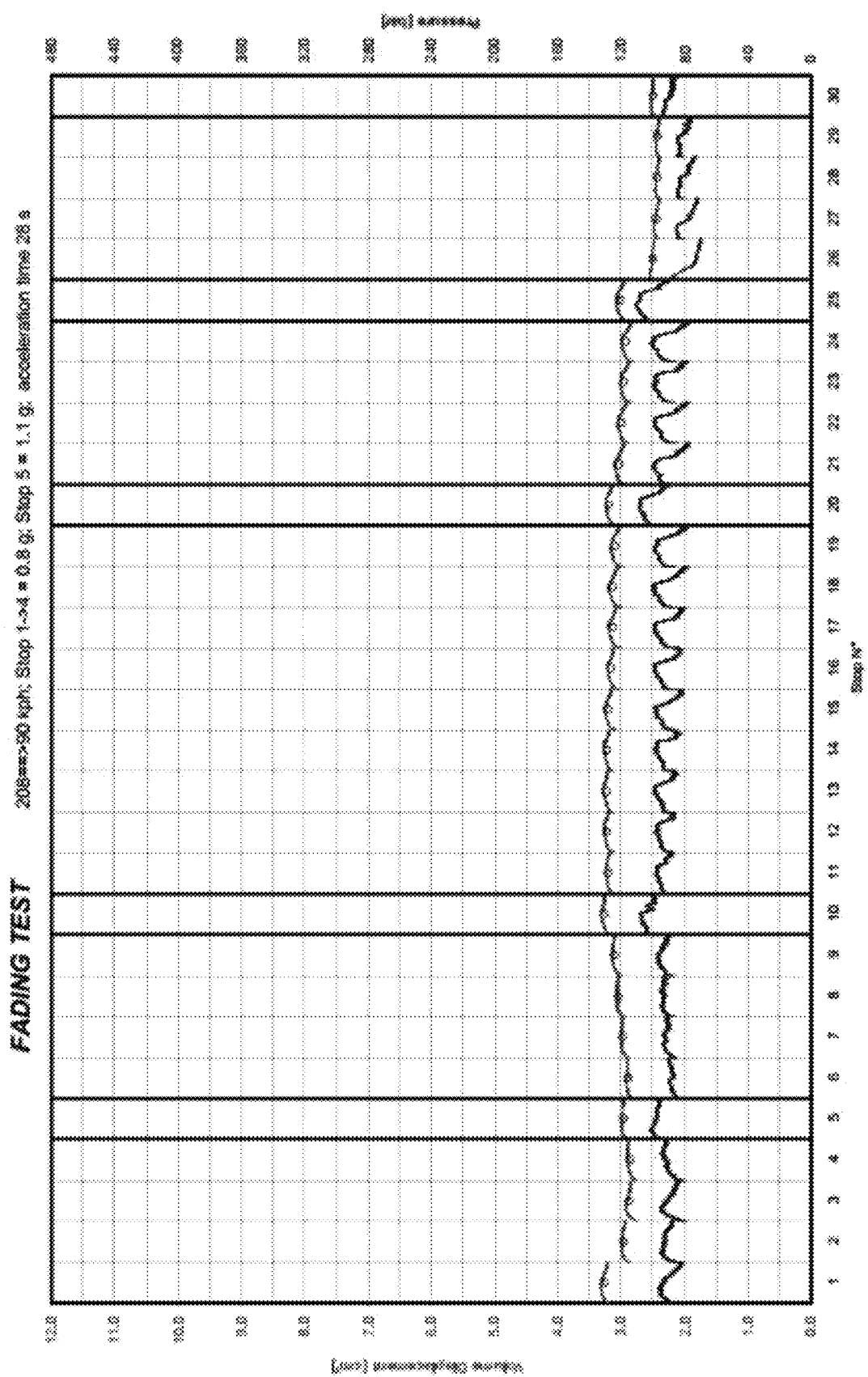

FIG. 17a
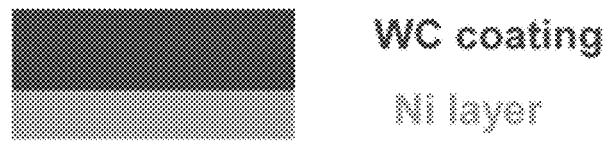

FIG. 18a
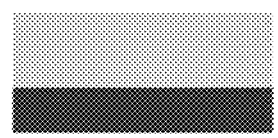
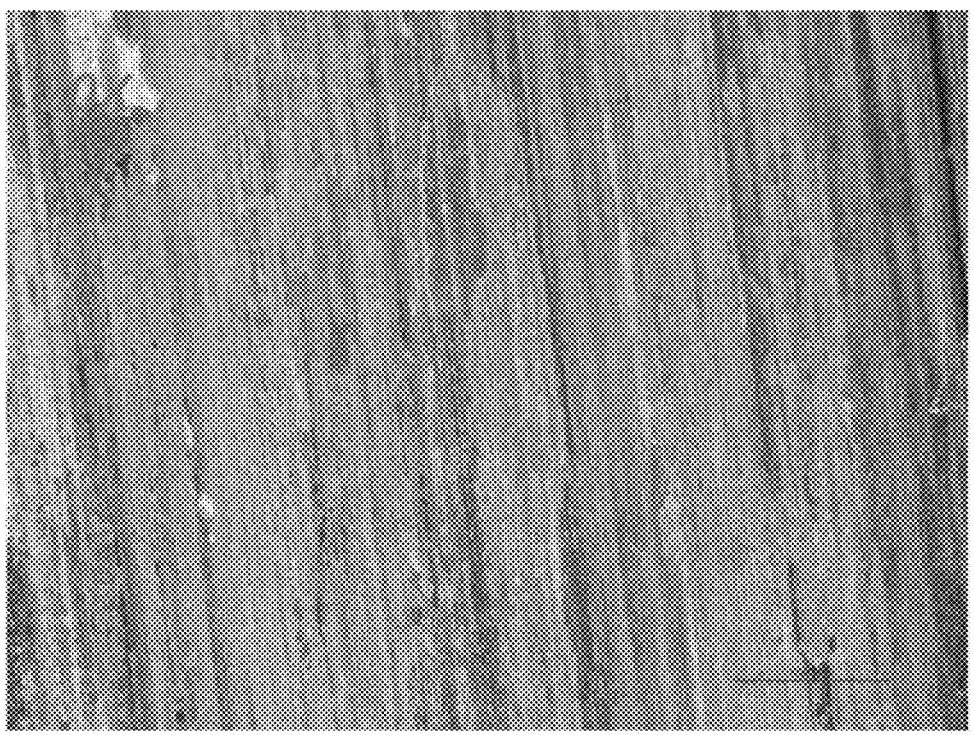

FIG. 18b
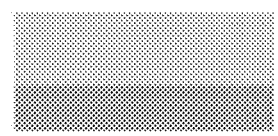 $Cr_3C_2$ +NiCr Medium Density
Ni layer
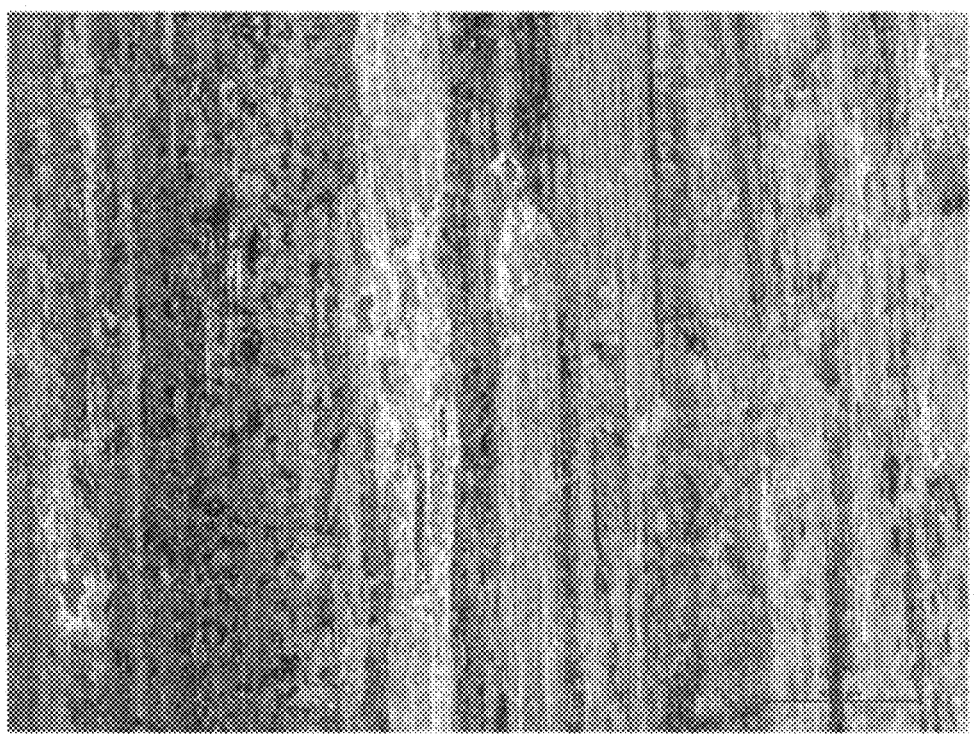

FIG. 19a
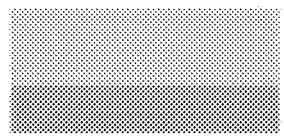 $Cr_3C_2$ +NiCr Medium Density
Ni layer

COATINGS FOR BRAKE DISCS, METHOD FOR REDUCING WEAR AND CORROSION AND ASSOCIATED BRAKE DISC

TECHNICAL FIELD

The present disclosure generally relates to coatings for the anti-corrosion covering of brake discs, as well as methods for reducing the wear of brake discs and their associated brake pads, and methods of using such coatings. Additionally, the disclosure generally relates to an associated brake disc, a friction surface of which can be covered with coatings according to the disclosure.

SUMMARY

It is described an anti-wear and anti-corrosion coating for a brake disc, which is applicable to at least one friction surface of the brake disc configured to cooperate in use with a braking element such as a brake pad, characterized in that the anti-wear and anti-corrosion coating consists of two layers coupled together, a first outermost surface layer, and an intermediate second layer, arranged between the first surface layer and said friction surface of the brake disc; the first surface layer of the coating consisting of particles of chromium carbide (Cr3C2) dispersed within a metallic matrix consisting of an NiCr alloy, the first layer having been applied by means of thermal spray; and the second layer consisting of a material selected from the group consisting of: particles of chromium carbide (Cr3C2) dispersed within a metallic matrix consisting of a high density alloy of NiCr applied by means of thermal spray, Ni5Al alloy applied by means of thermal spray; Cr—Ni austenitic steel, preferably constituted by a FeNiCrMoSiC alloy applied by means of thermal spray; Ni applied with a galvanic deposition system; Ni applied by thermal spray; NiCr alloy applied by thermal spray; any combination of the foregoing; the first layer being deposited upon the second layer previously deposited upon said friction surface of the disc.

It is also described an anti-wear and anti-corrosion coating as referred to above, wherein said particles of chromium carbide (Cr3C2) are dispersed in spheroidal form; said first layer having been applied with a deposition system of the same via HVOF technique.

It is also described an anti-wear and anti-corrosion coating as referred to above, wherein it has a thickness between 20 and 400 micrometers.

It is also described an anti-wear and anti-corrosion coating according to one of the preceding claims, that has, after coating and grinding, a surface roughness between 0.05 and 1.0 micrometers; said thermal spray coating when applied to manufacture said first and/or second layer, consisting in a deposition system via HVOF technique.

It is also described a vehicle brake disc including at least one friction surface intended to cooperate in use with a braking element such as a brake pad, characterized in that at least said friction surface is covered with an anti-wear and anti-corrosion coating as referred to above.

It is also described a method for the simultaneous reduction in wear of a brake disc and associated brake pads, comprising the steps of:
preparing brake pads using a copper-free (Low Steel or Non-Asbestos Organic) type friction material formulation;
covering at least one friction surface of a brake disc intended to cooperate in use with a brake pad with an anti-wear and anti-corrosion coating consisting of a first surface layer of particles of chromium carbide (Cr3C2) dispersed within a metallic matrix consisting of a NiCr alloy, and coupled to a second layer consisting of selected combinations of metallic materials, selected from the group consisting of: particles of Cr3C2 dispersed within a matrix of high density NiCr, NiAl alloys, Cr—Ni austenitic steel preferably consisting of FeNiCrMoSiC alloys, metallic nickel, NiCr alloys; any combination of the foregoing;
coupling together the previously prepared brake pads and the brake disc.

In the afore described method the anti-wear and anti-corrosion coating is applied by means of the HVOF (High Velocity Oxygen Fuel) thermal spray technology, to the exclusion of the metallic nickel layer, which is applied by HVOF thermal spray or by galvanic means.

In the afore described method the brake pads manufactured with a friction material belonging to the copper-free family (Low-Steel or Non-Asbestos Organic) are coupled together with said anti-wear and anti-corrosion coating coated on at least one friction surface of the brake disc.

It is also described the use of friction materials belonging to the copper-free family (Low-Steel or Non-Asbestos Organic) for the manufacture of brake pads in combination with the use of anti-wear and anti-corrosion coatings on at least one friction surface of brake discs associated in operation with said brake pads in order to simultaneously reduce the wear of the brake pads and of the brake discs and to reduce the probability of the formation of corrosive phenomena of any kind; characterized in that said anti-wear and anti-corrosion coatings consist of a first surface layer of particles of chromium carbide (Cr3C2) dispersed within a metallic matrix consisting of a NiCr alloy, and coupled to a second layer consisting of selected combinations of metallic materials, selected from the group consisting of: particles of Cr3C2 dispersed within a matrix of high density NiCr, NiAl alloys, Cr—Ni austenitic steels preferably constituted by FeNiCrMoSiC alloys, metallic nickel; NiCr alloys; any combination of the foregoing.

It is also described a braking system comprising an element to be braked consisting of a brake disc made of cast iron or steel and at least one braking element consisting of a brake shoe or pad, suitable for cooperating by friction with the element to be braked, characterized in that, in combination:
the element to be braked has at least one friction surface configured to cooperate with the braking element, which friction surface is covered with an anti-wear and anti-corrosion coating as described above;
the braking element comprises at least one friction material block configured to cooperate with the element to be braked, the friction material being of the copper free type (Low Steel or Non-Asbestos Organic).

BRIEF DESCRIPTION OF FIGURES

Further characteristics and advantages will become clear from the following description of its exemplary non-limiting embodiments given purely by way of example and with reference to the figures of the attached drawings, in which:

FIGS. 5a and 5b show the same graphs of FIGS. 1a and 1b obtainable after a fading test performed on a commercial cast iron brake disc similar to that in FIGS. 1a and 1b, but covered with a third embodiment of the anti-wear and anti-corrosion coating according to the disclosure (surface layer in Cr3C2+NiCr coupled with an intermediate layer of FeNiCrMoSiC austenitic steel), using brake pads made with a "Cu-free" type compound (Disc A3;

FIGS. 6a and 6b show the same graphs of FIGS. 1a and 1b obtainable after a fading test carried out on a commercial cast iron brake disc similar to that in FIGS. 1a and 1b, but covered with a fourth anti-wear and anti-corrosion coating according to the disclosure, formed by a surface layer in Cr3C2+NiCr coupled to an intermediate layer in galvanic Ni, using brake pads made with a "Cu-free" type compound (Disc A4);

FIGS. 8a and 8b show the same graphs of FIGS. 1a and 1b obtainable after a fading test carried out on a commercial cast iron brake disc similar to that in FIGS. 1a and 1b, but covered with a sixth anti-wear and anti-corrosion coating according to the disclosure formed by a surface layer in Cr3C2+NiCr coupled to an intermediate layer in NiCr alloy, using brake pads made with a "Cu-free" type compound (Disc A6);

FIGS. 17a to 19b show comparative surface micrographs after fading of the brake discs coated with the layers of the preceding figures;

DETAILED DESCRIPTION

Figure 1A:
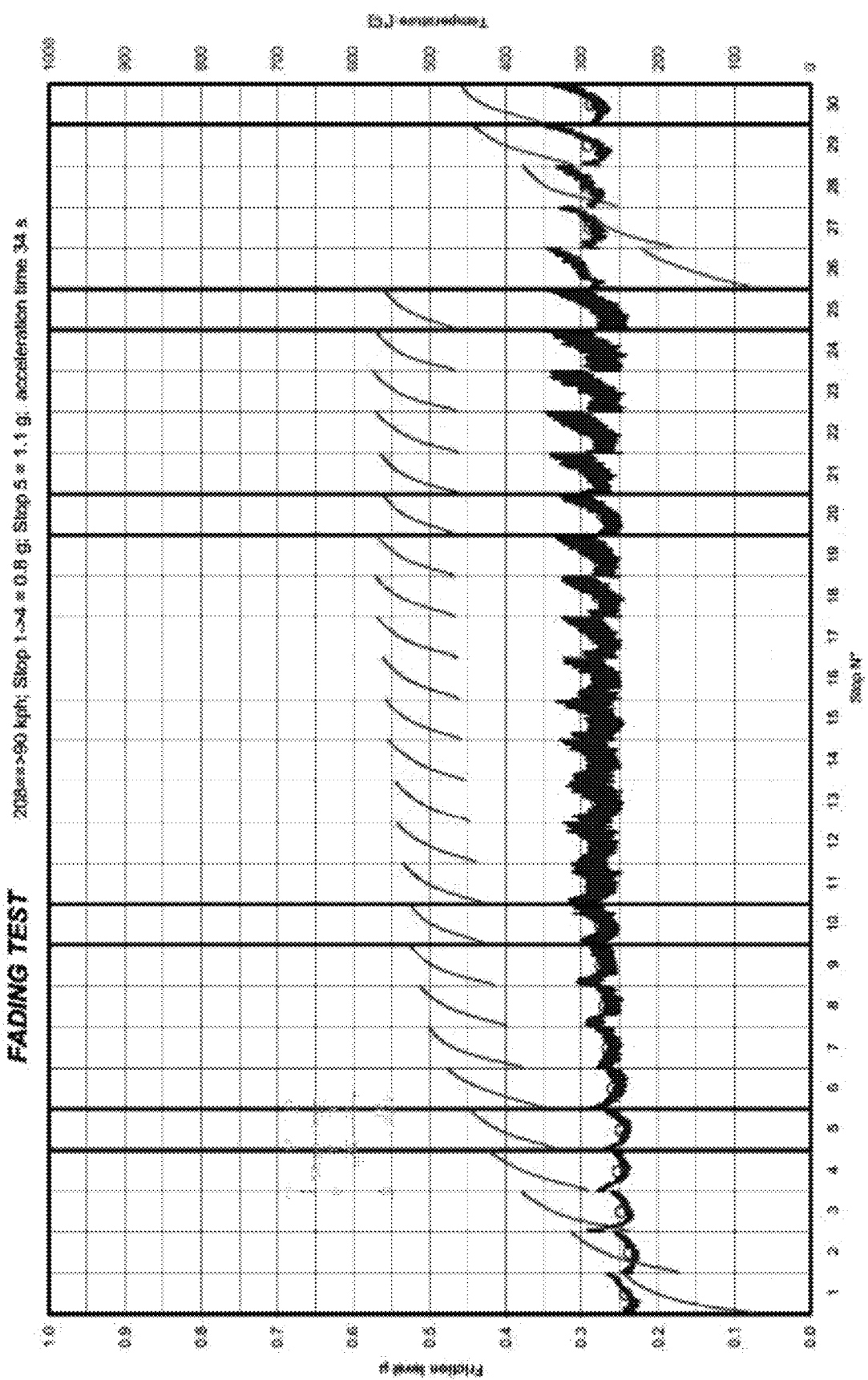
FIGS. 1a and 1b show graphs (Fade, oil consumption, friction coefficient trend) obtainable after a fading test performed on a commercial cast iron brake disc using brake pads made with a "Cu-free" type compound (Disc A)
Figure 1B:
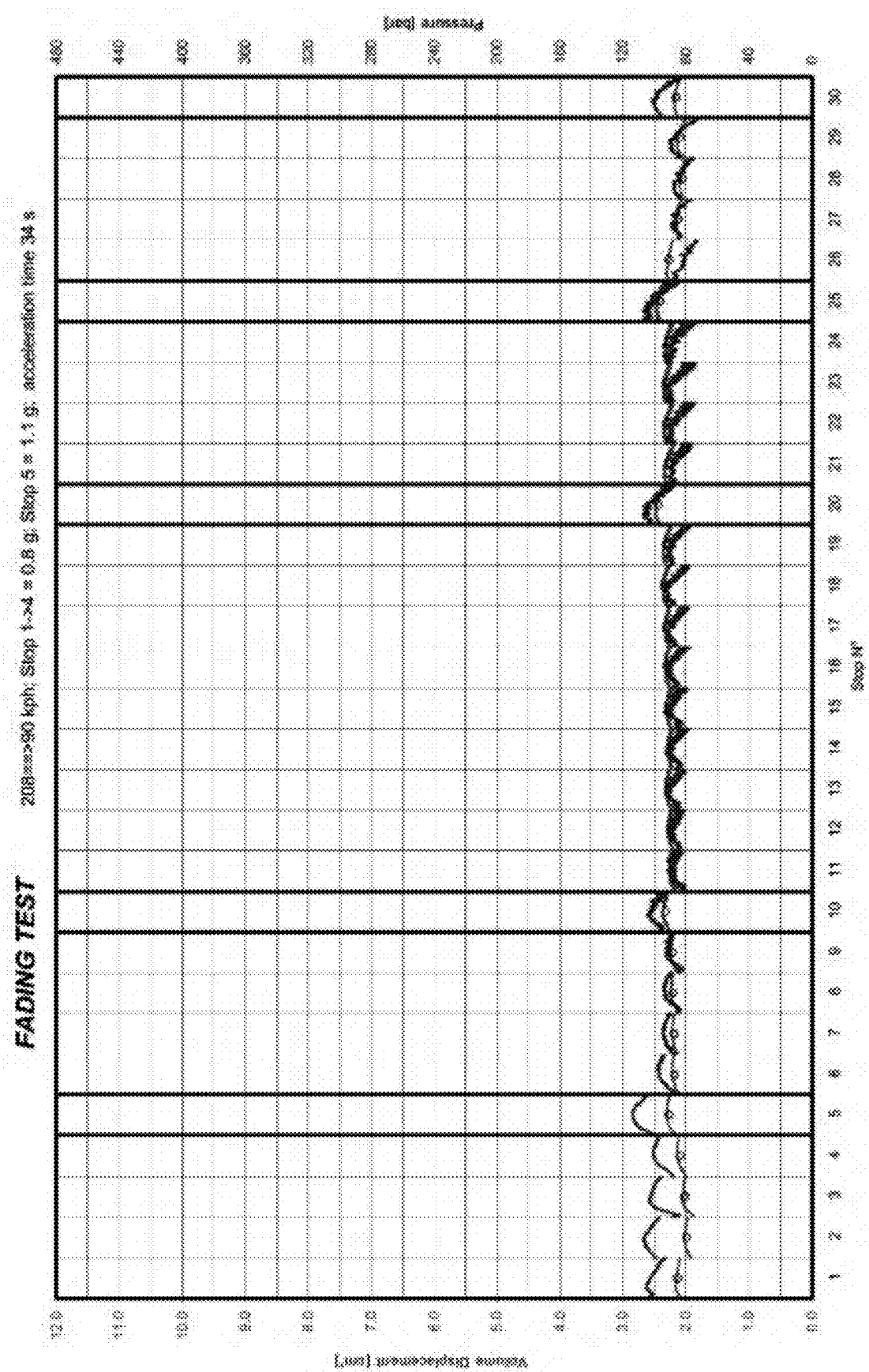
Figure 2A:
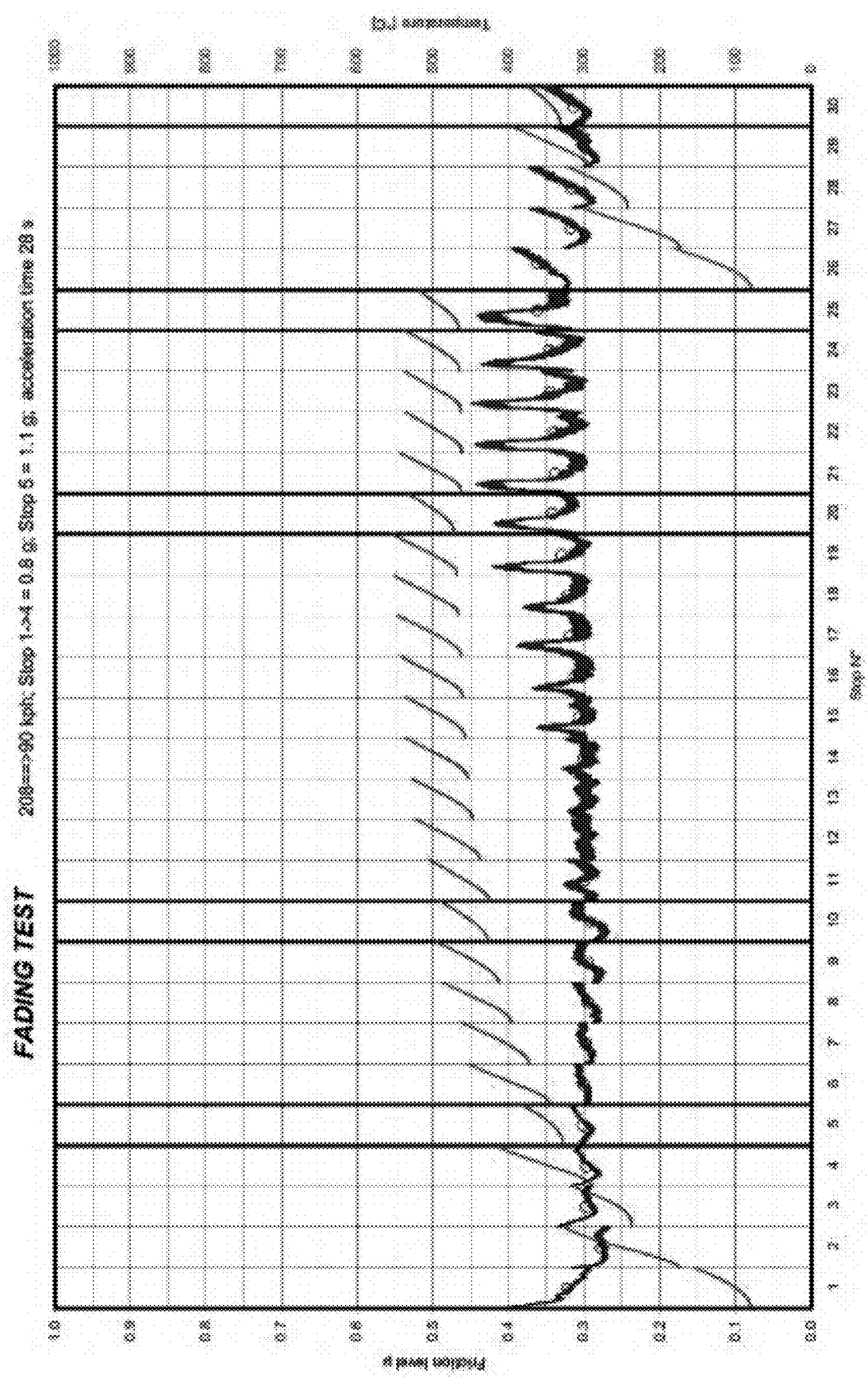
FIGS. 2a and 2b are a comparative view of the same graphs of FIGS. 1a and 1b obtainable after a test carried out on a cast-iron brake disc covered with an anti-wear coating currently on the market; i.e. a coating consisting of tungsten carbide (WC) deposited on a galvanic nickel layer, using brake pads made with a "Cu-free" type compound (Disc A0)
Figure 2B:
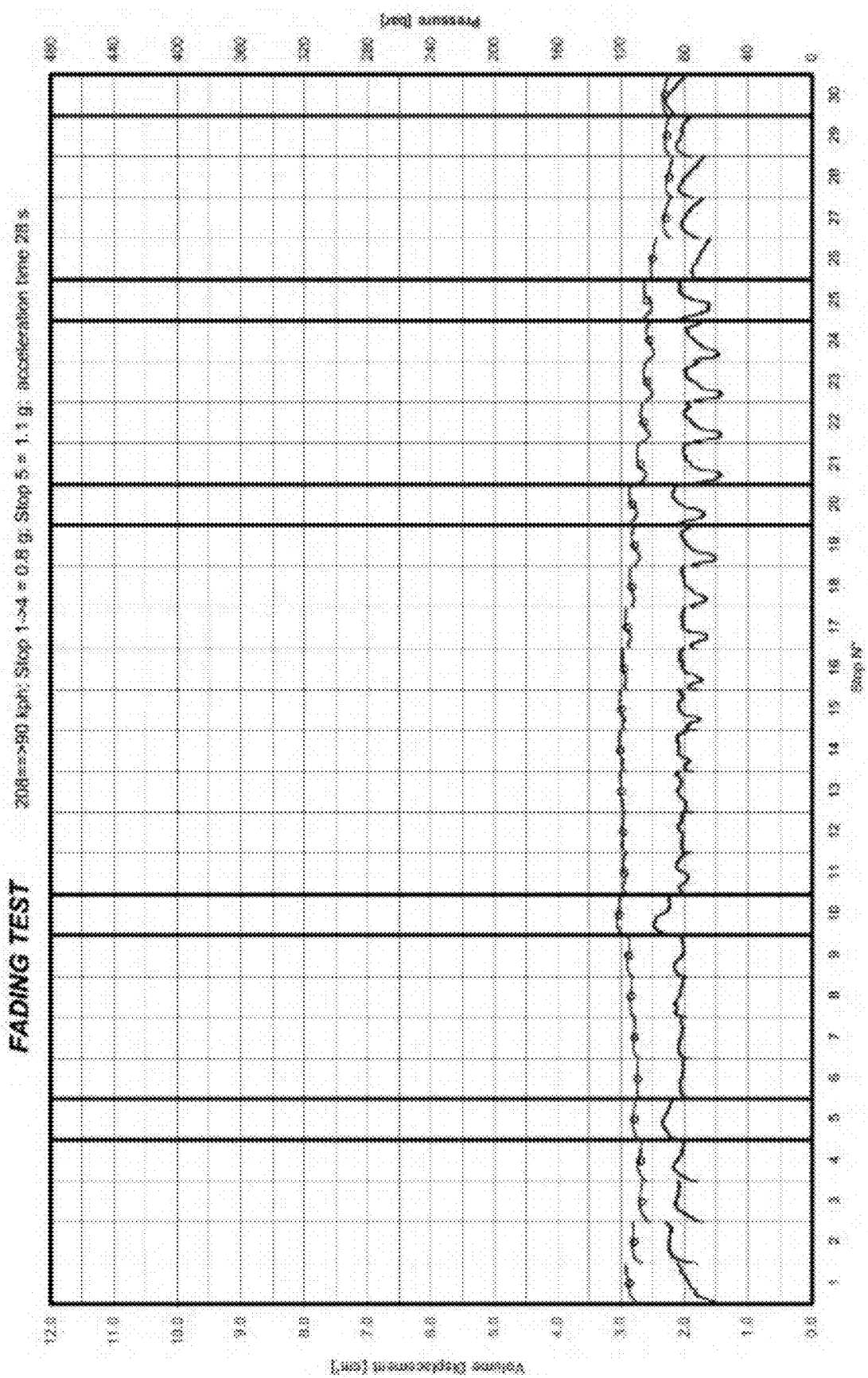
Figure 3A:
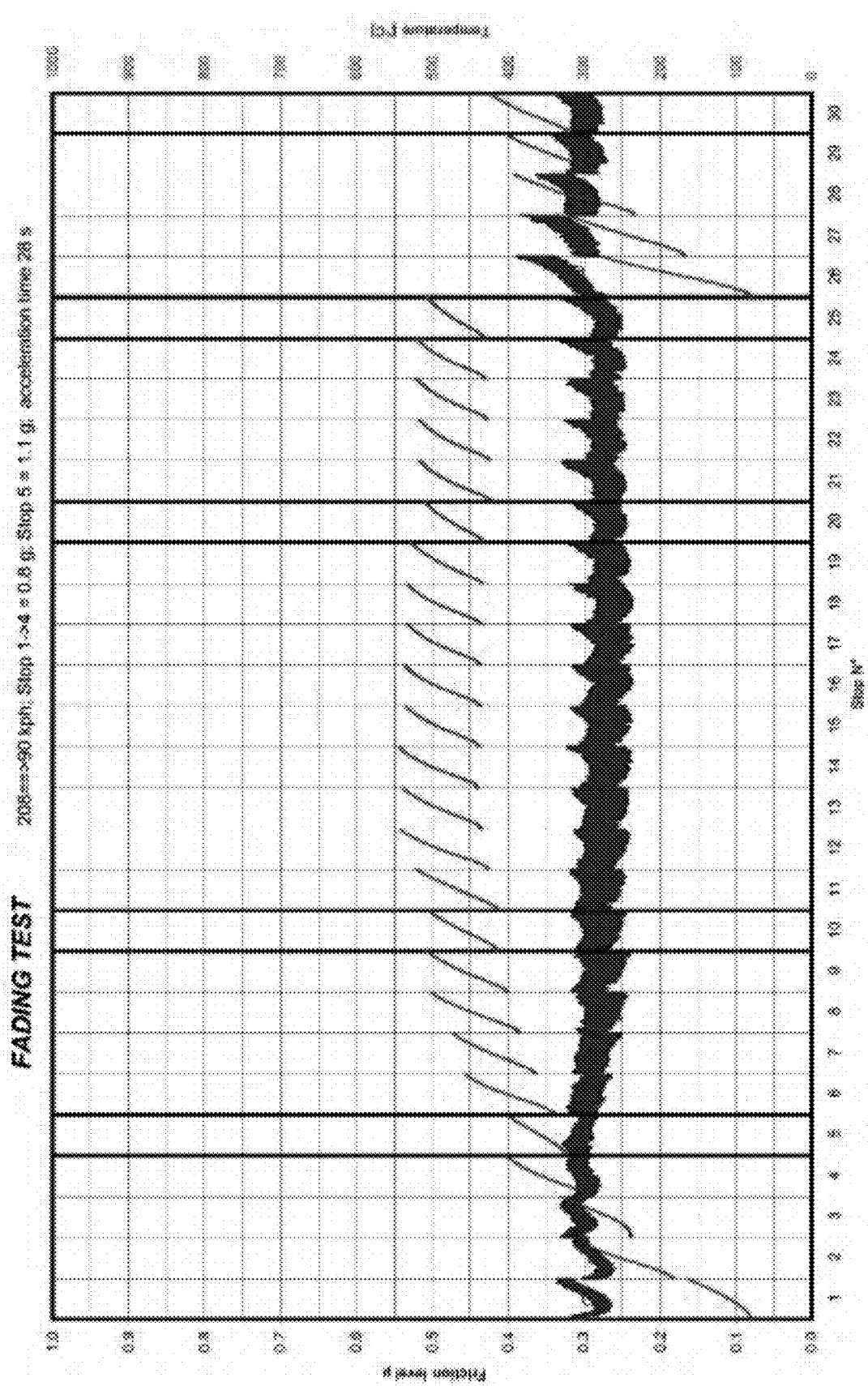
FIGS. 3a and 3b show the same graphs of FIGS. 1a and 1b obtainable after a fading test carried out on a commercial cast iron brake disc similar to that in FIGS. 1a and 1b, but covered with the anti-wear and anti-corrosion coating according to the disclosure (surface layer in Cr3C2+NiCr coupled with an intermediate layer still in Cr3C2+NiCr but with high density, using brake pads made with a "Cu-free" type compound (Disc A1)
Figure 3B:
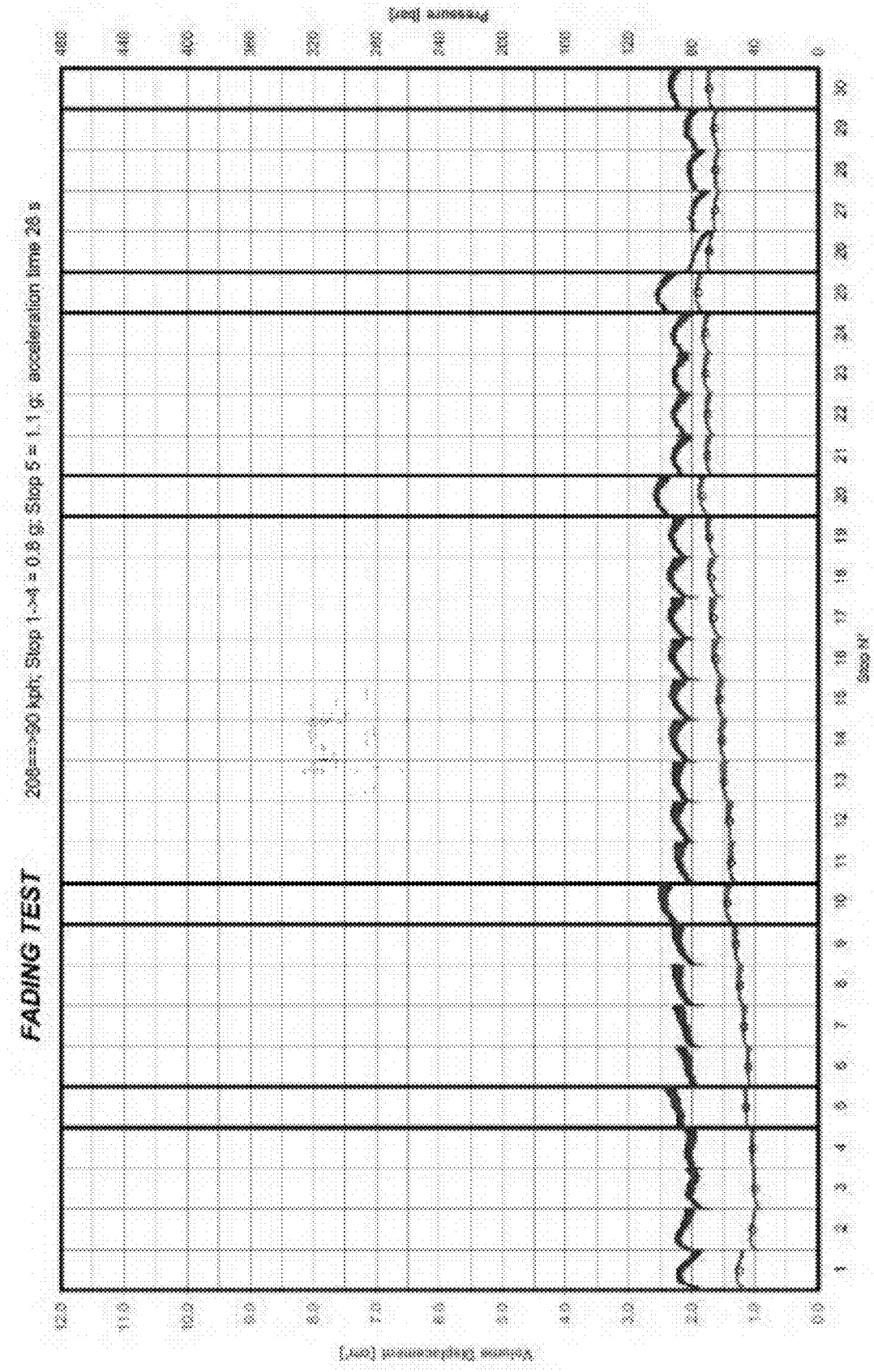
Figure 4A:
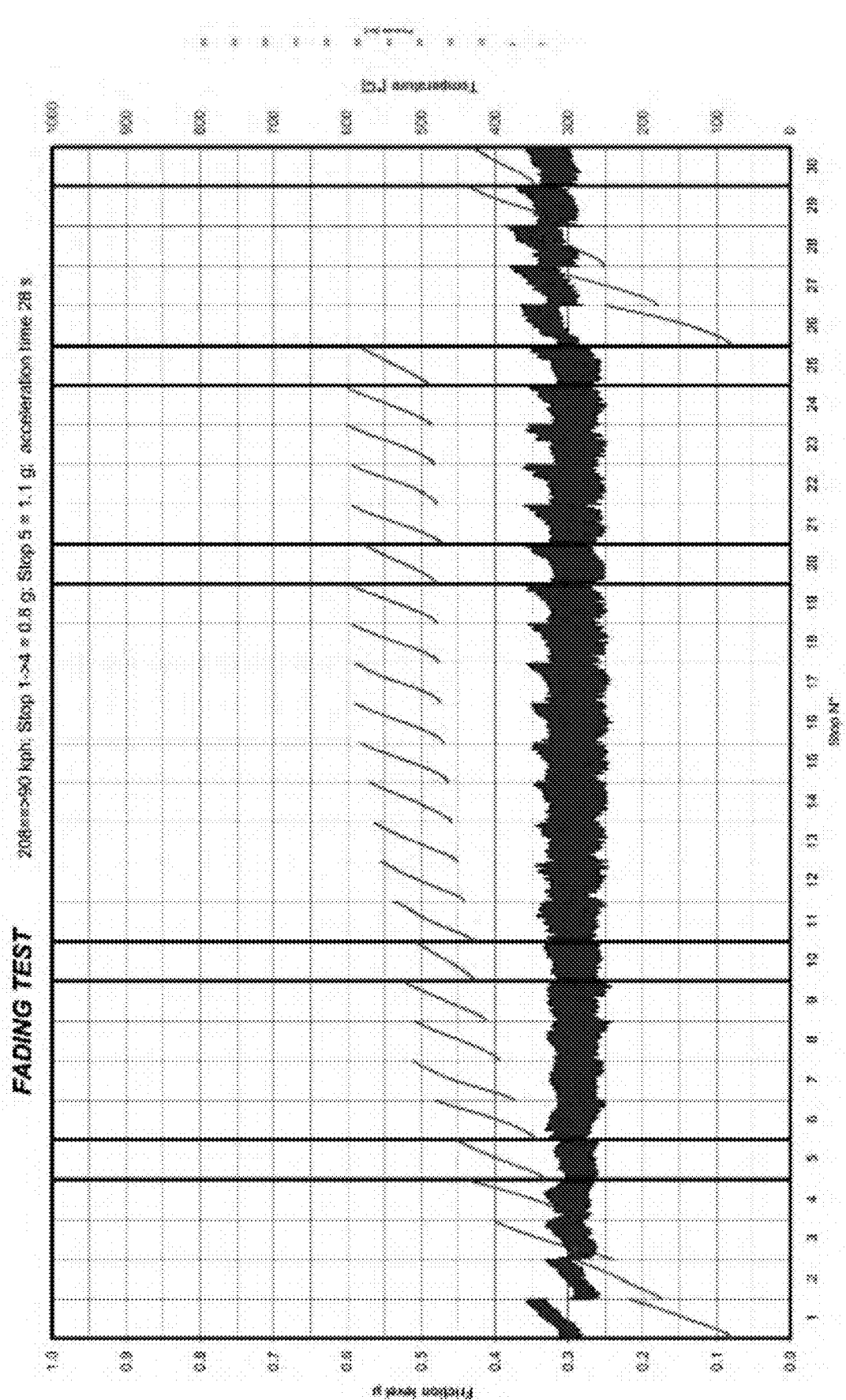
FIGS. 4a and 4b show the same graphs of FIGS. 1a and 1b obtainable after a fading test performed on a commercial cast iron brake disc similar to that in FIGS. 1a and 1b, but covered with a second embodiment of the anti-wear and anti-corrosion coating according to the disclosure (surface layer in Cr3C2+NiCr coupled with an intermediate layer in Ni5Al), using brake pads made with a "Cu-free" type compound (Disc A2)
Figure 4B:
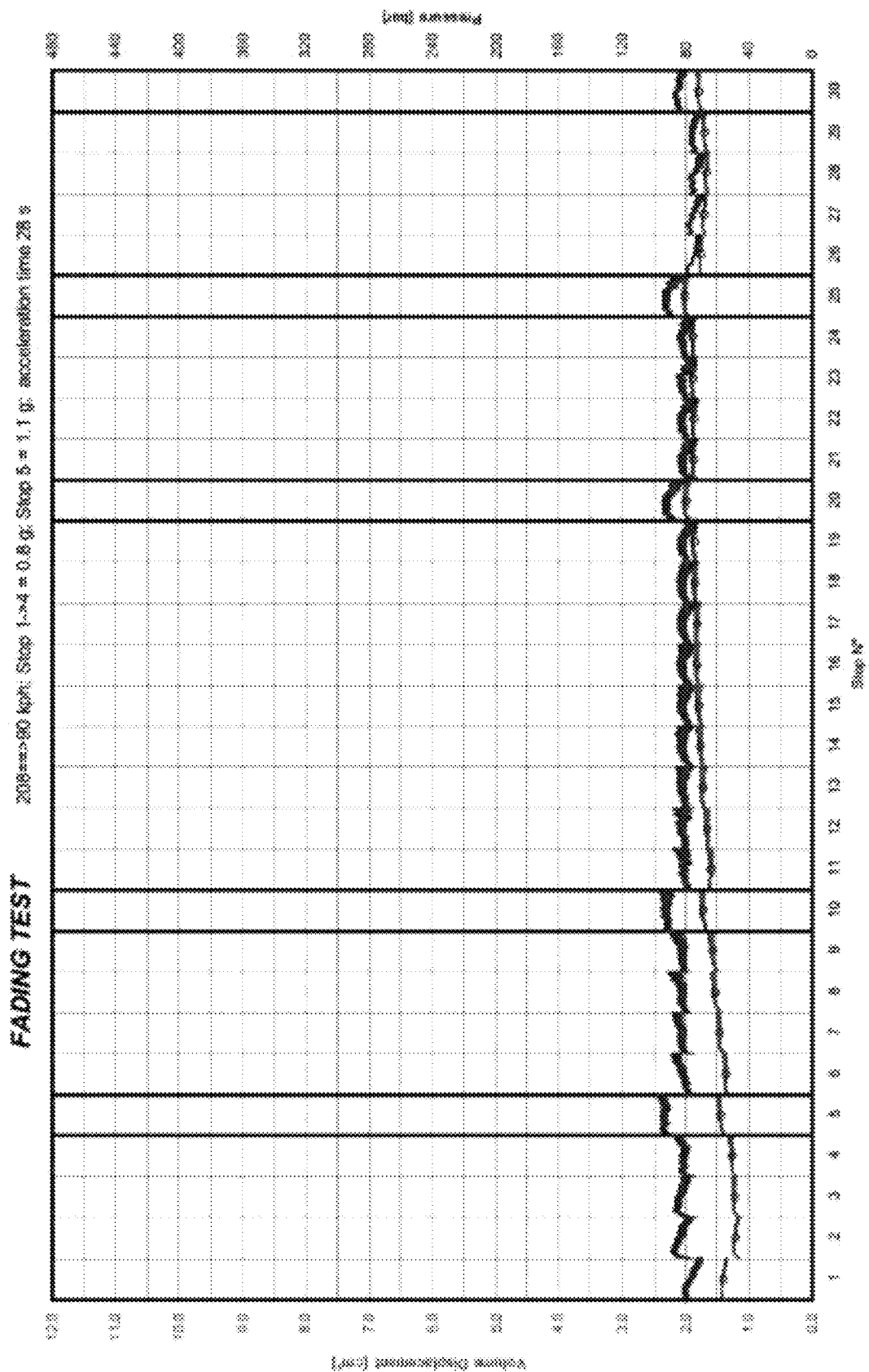
Figure 5B:
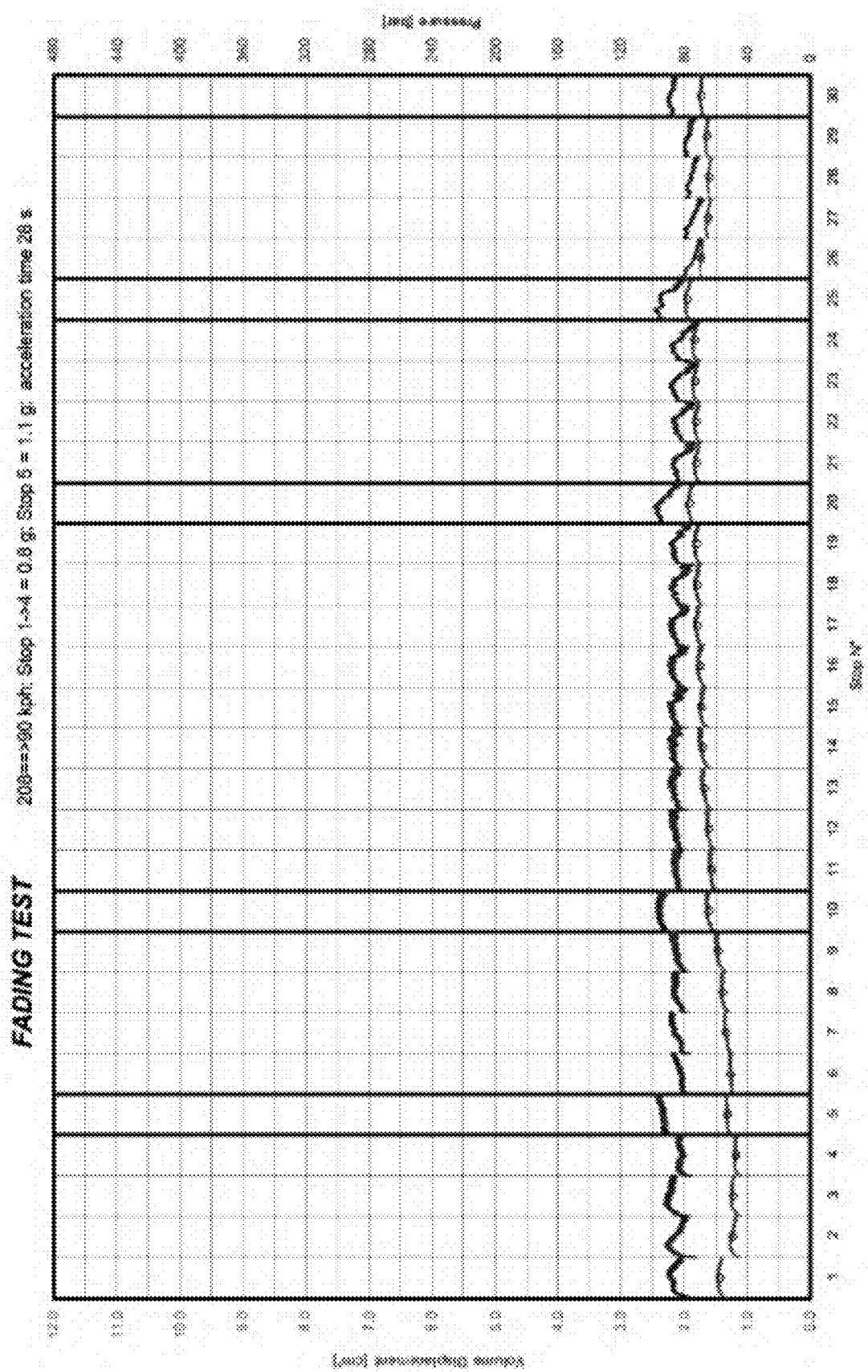
Figure 6A:
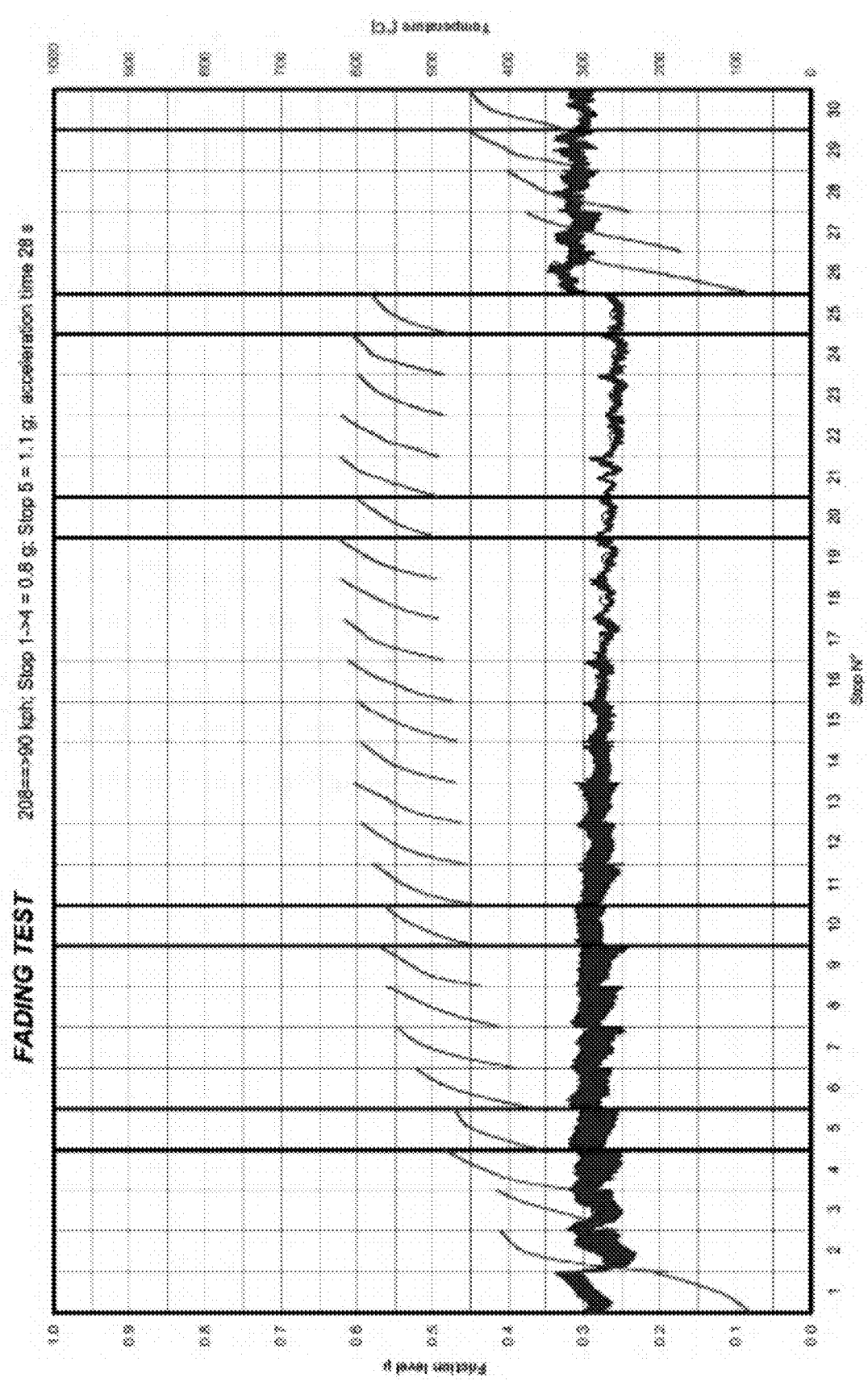
Figure 7A:
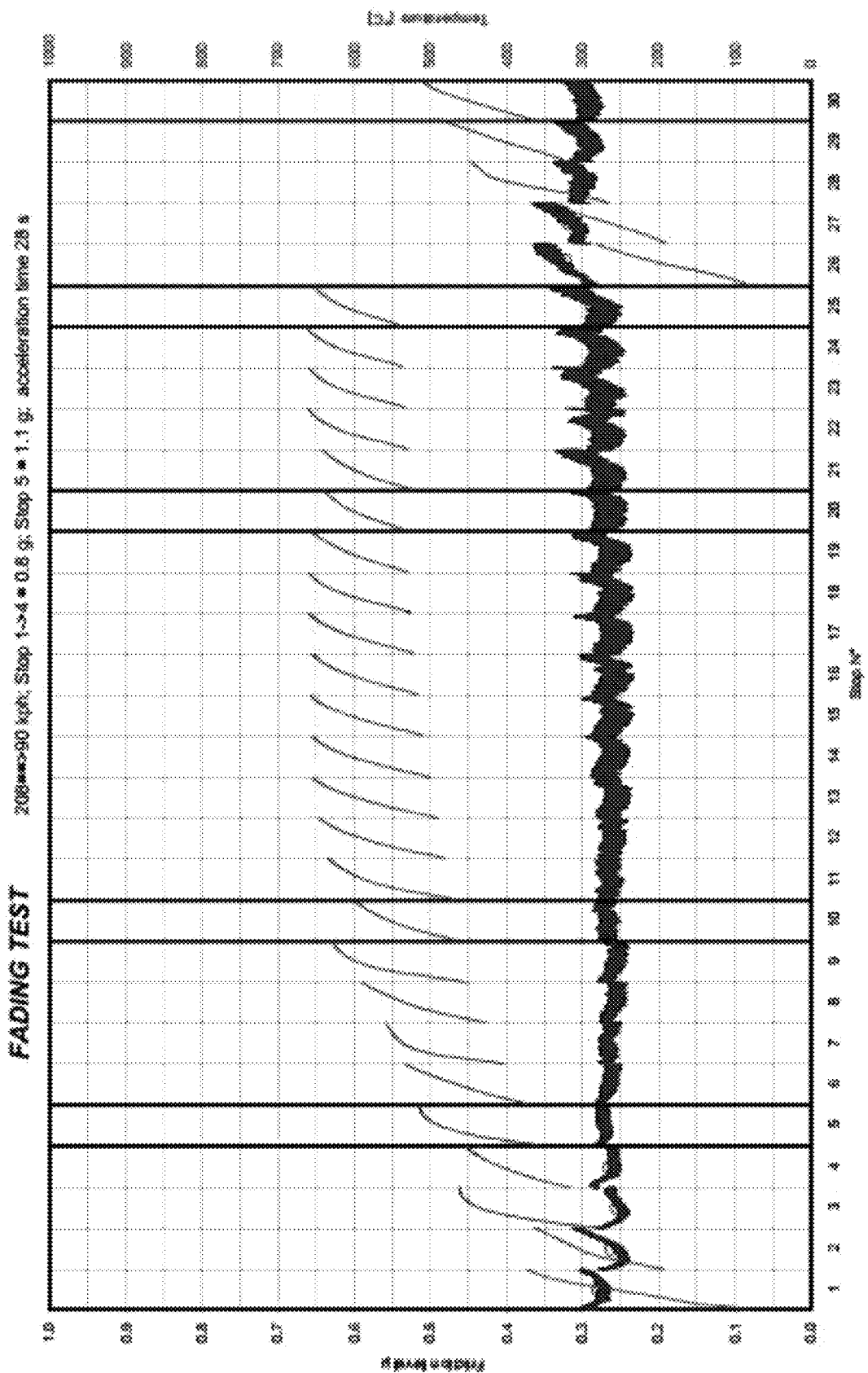
FIGS. 7a and 7b show the same graphs of FIGS. 1a and 1b obtainable after a fading test carried out on a commercial cast iron brake disc similar to that in FIGS. 1a and 1b, but covered with a fifth anti-wear and anti-corrosion coating according to the disclosure, formed by a surface layer in Cr3C2+NiCr coupled with an intermediate layer in Ni metal laid with the HVOF technique, using brake pads made with a "Cu-free" type compound (Disc A5)
Figure 7B:
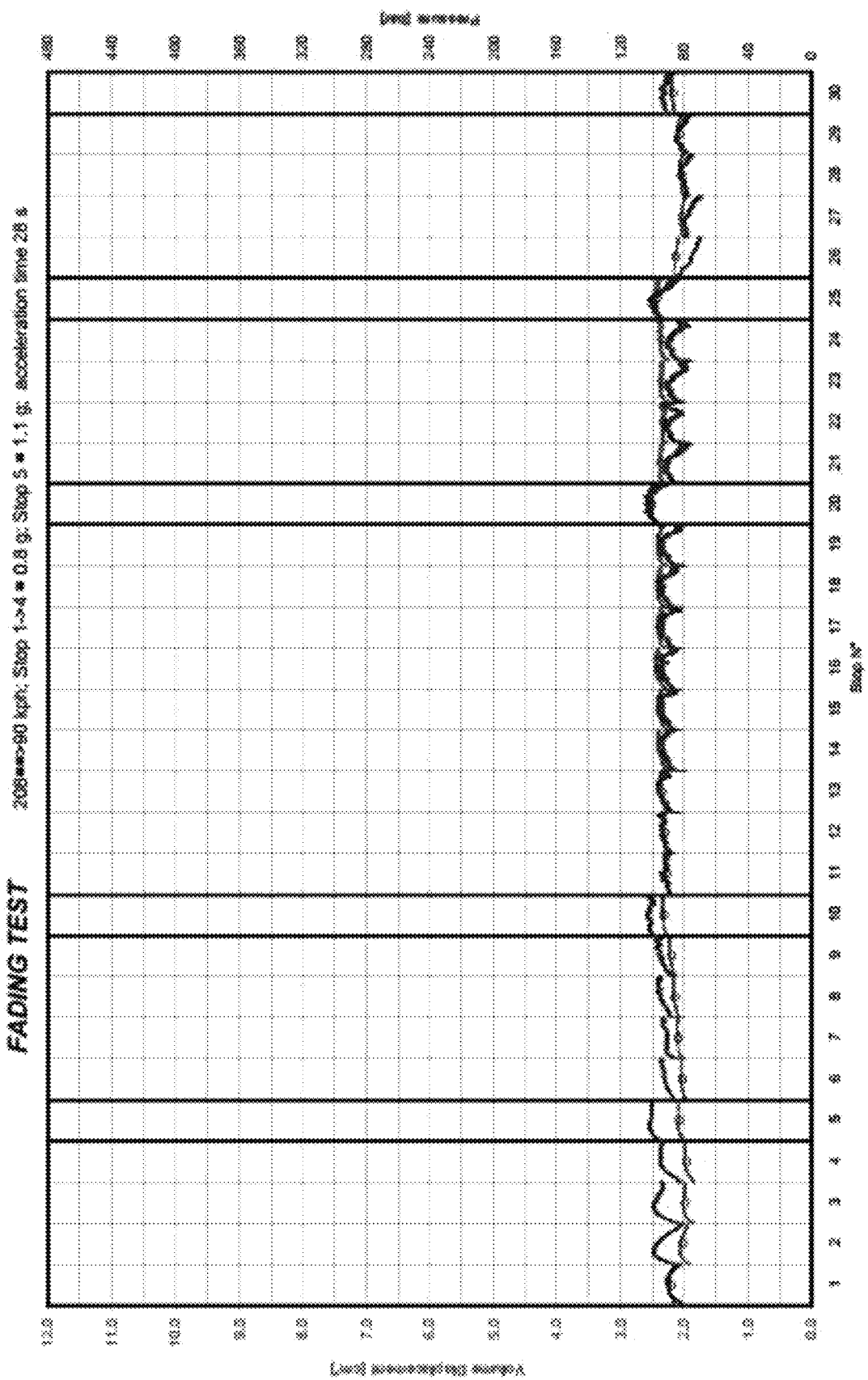
Figure 8A:
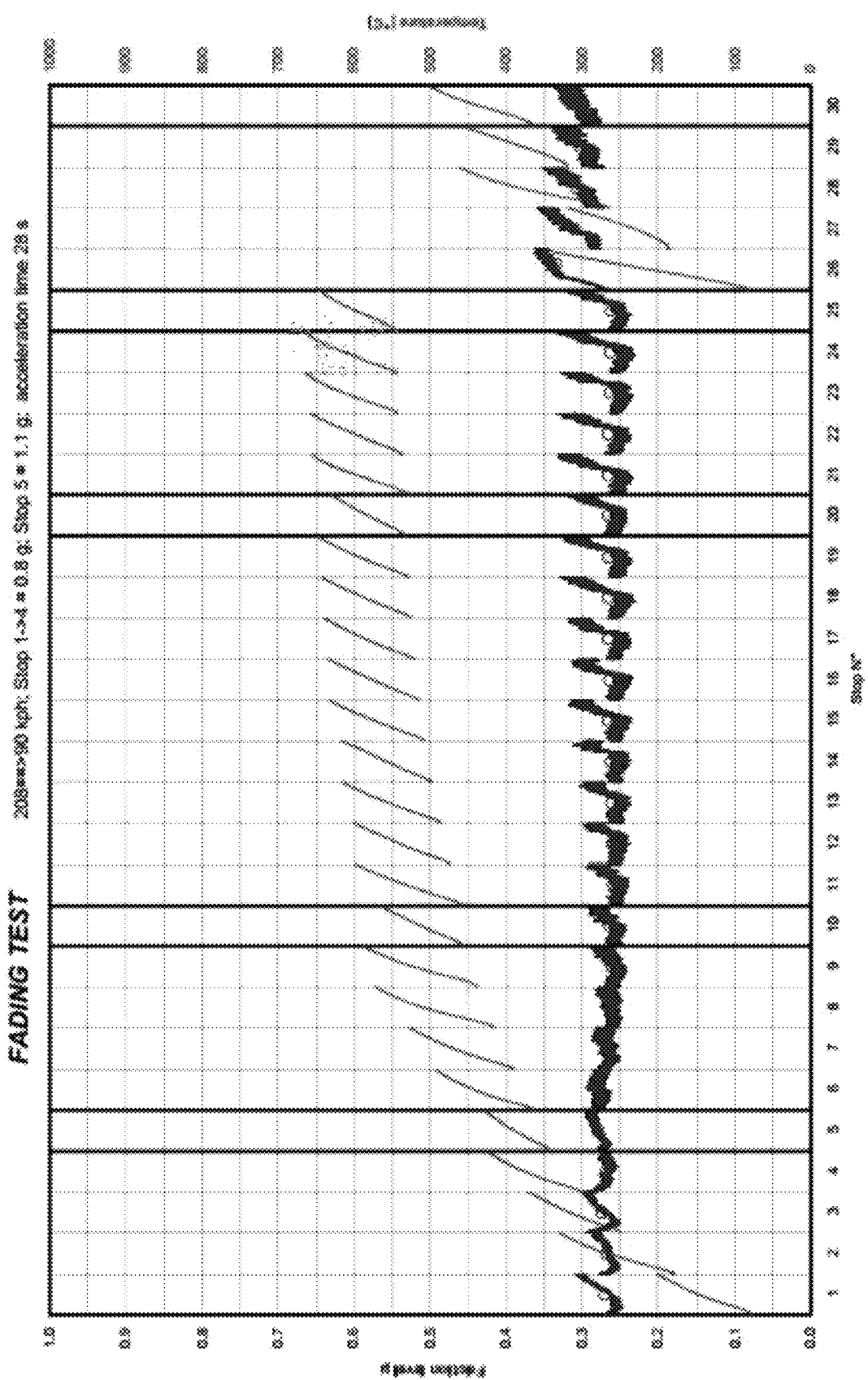
Figure 9A:
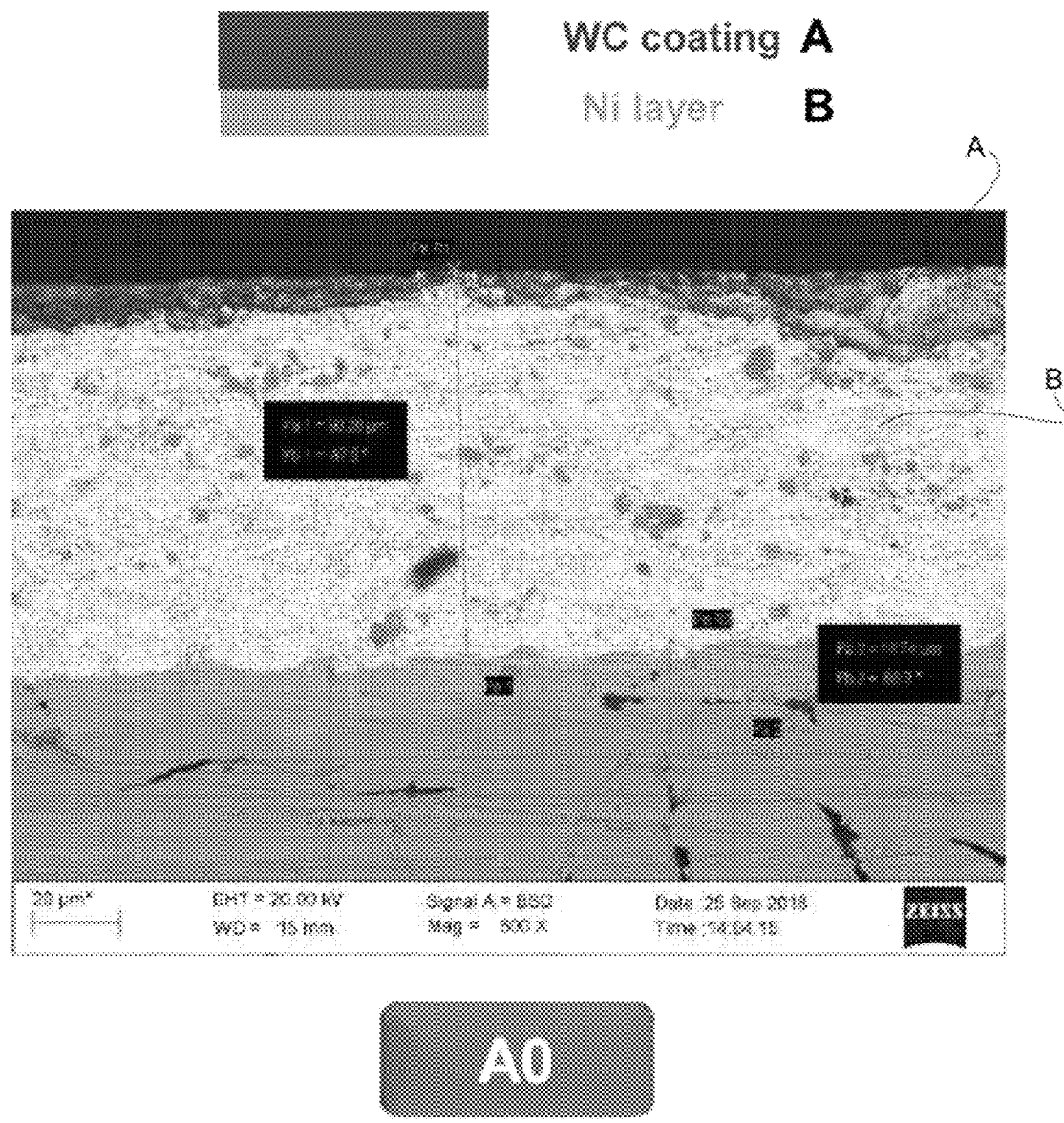
FIGS. 9a to 11b show respective radial section micrographs of the anti-wear and anti-corrosion coatings of the disclosure positioned in such a way as to cover the brake discs used in the fading tests of the preceding figures.
Figure 9B:
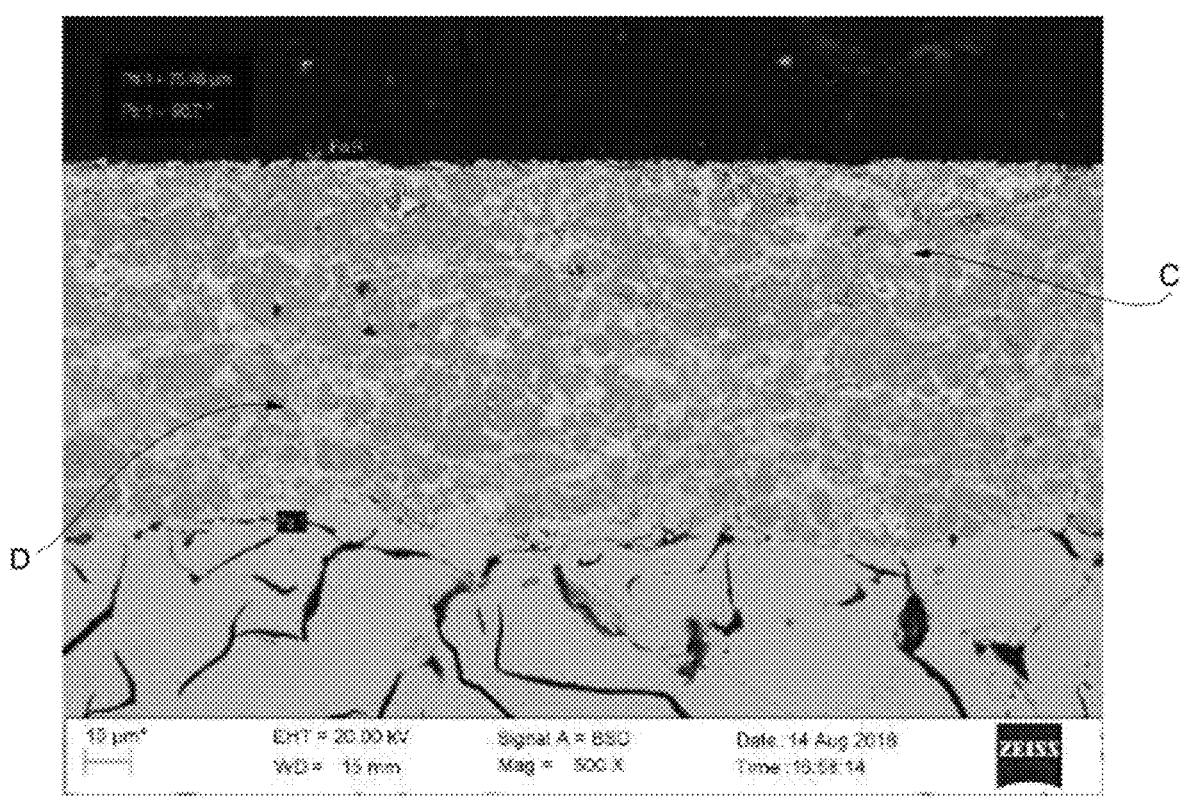
Figure 9C:
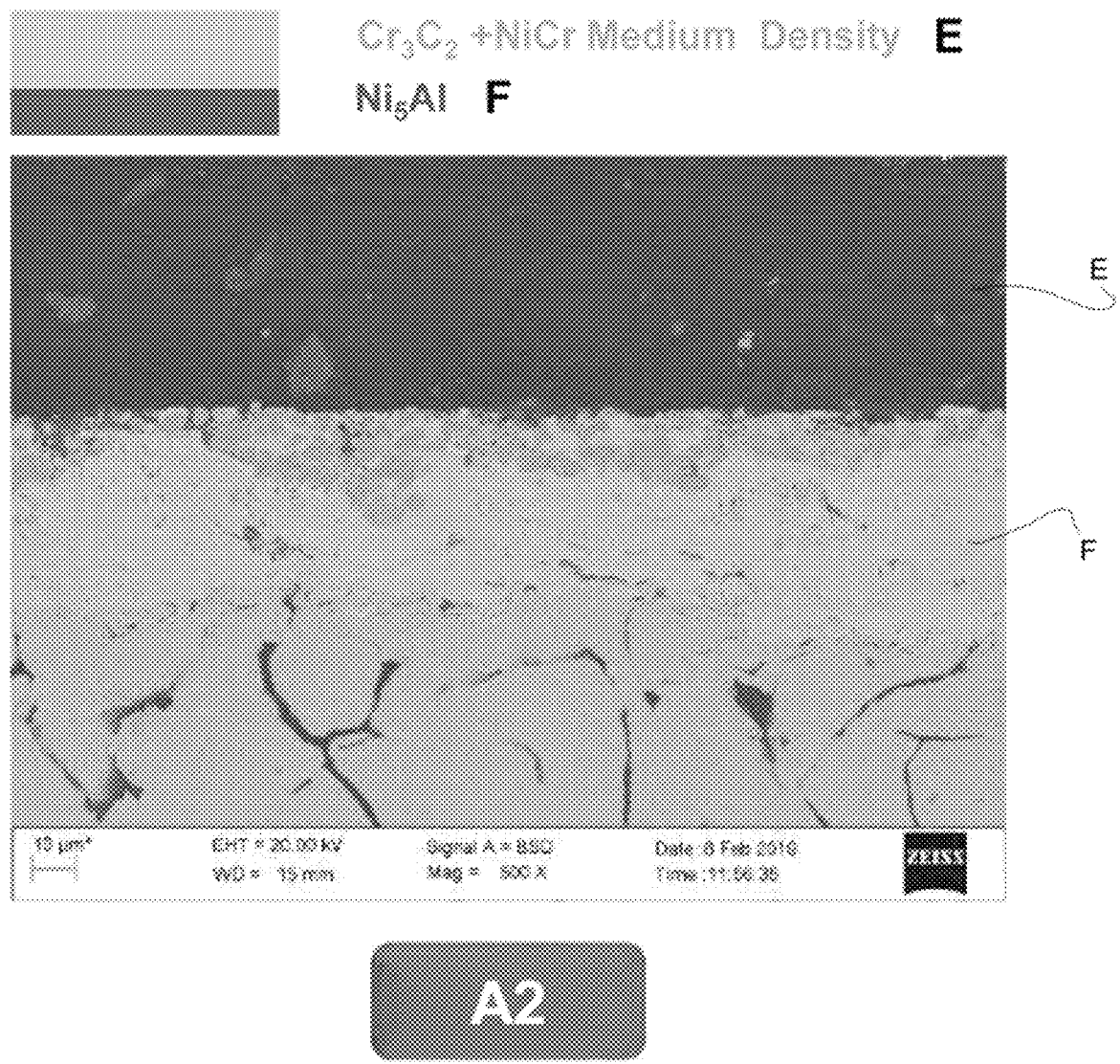
Figure 10A:
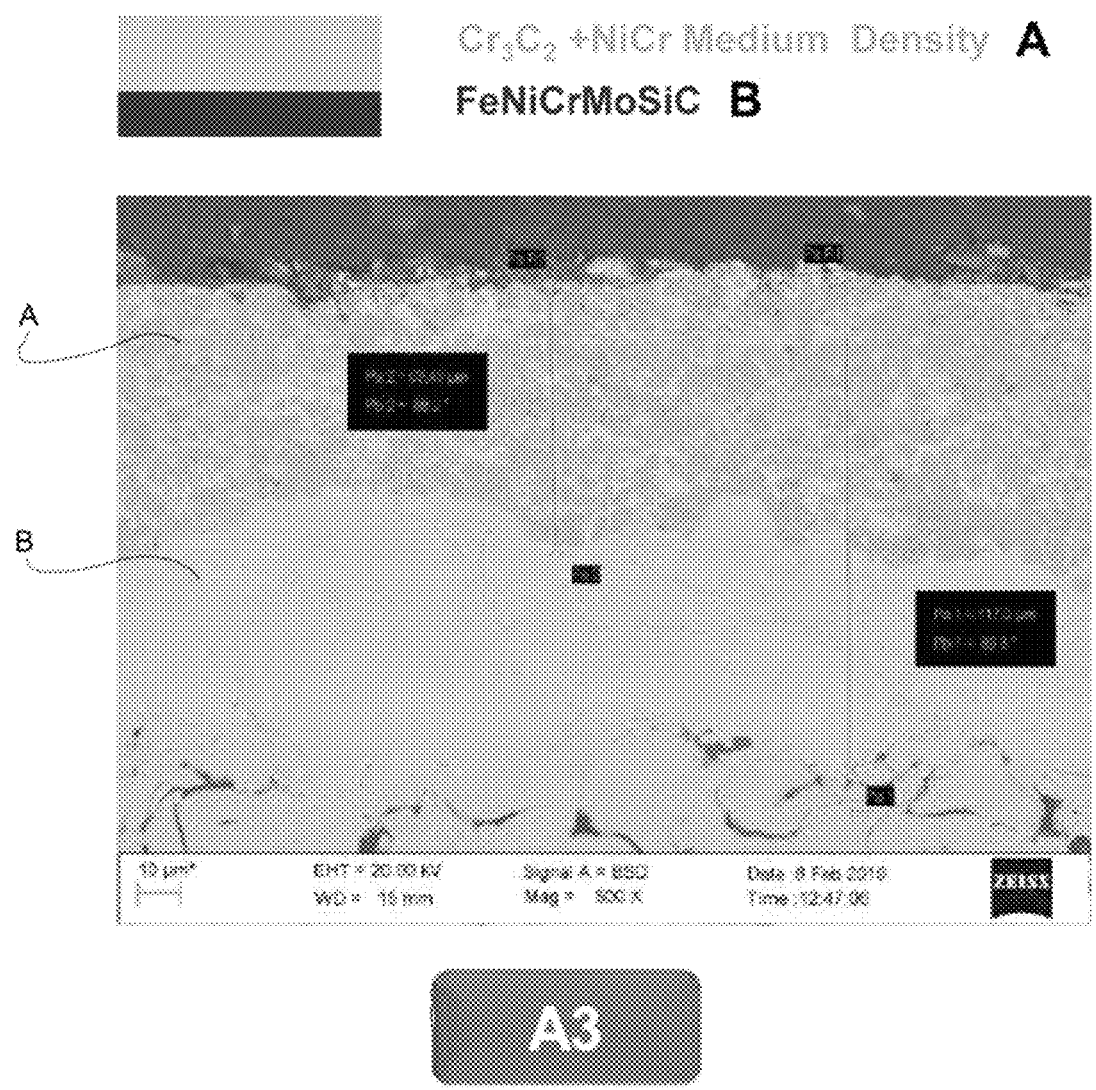
Figure 10B:
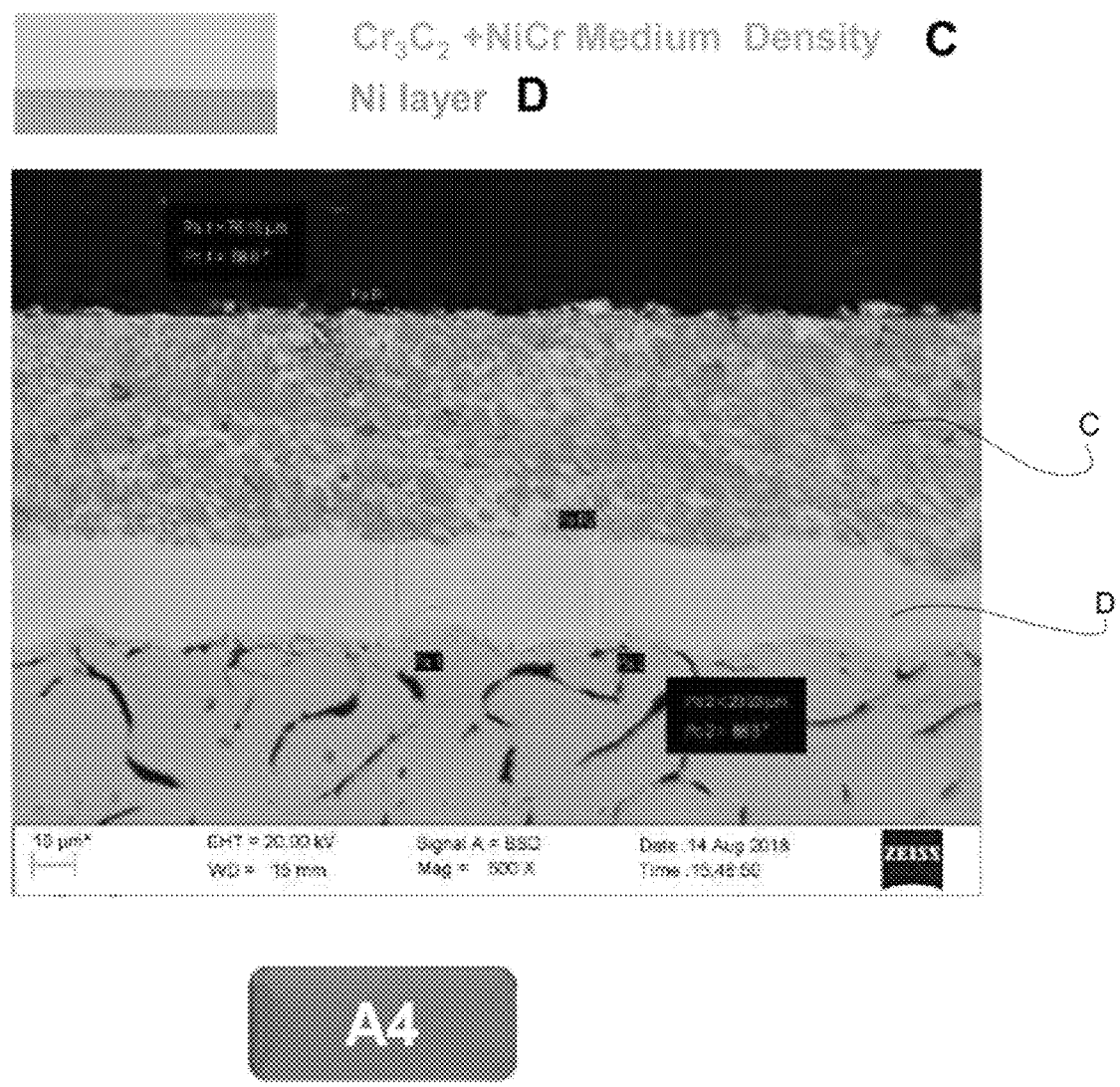
Figure 11A:
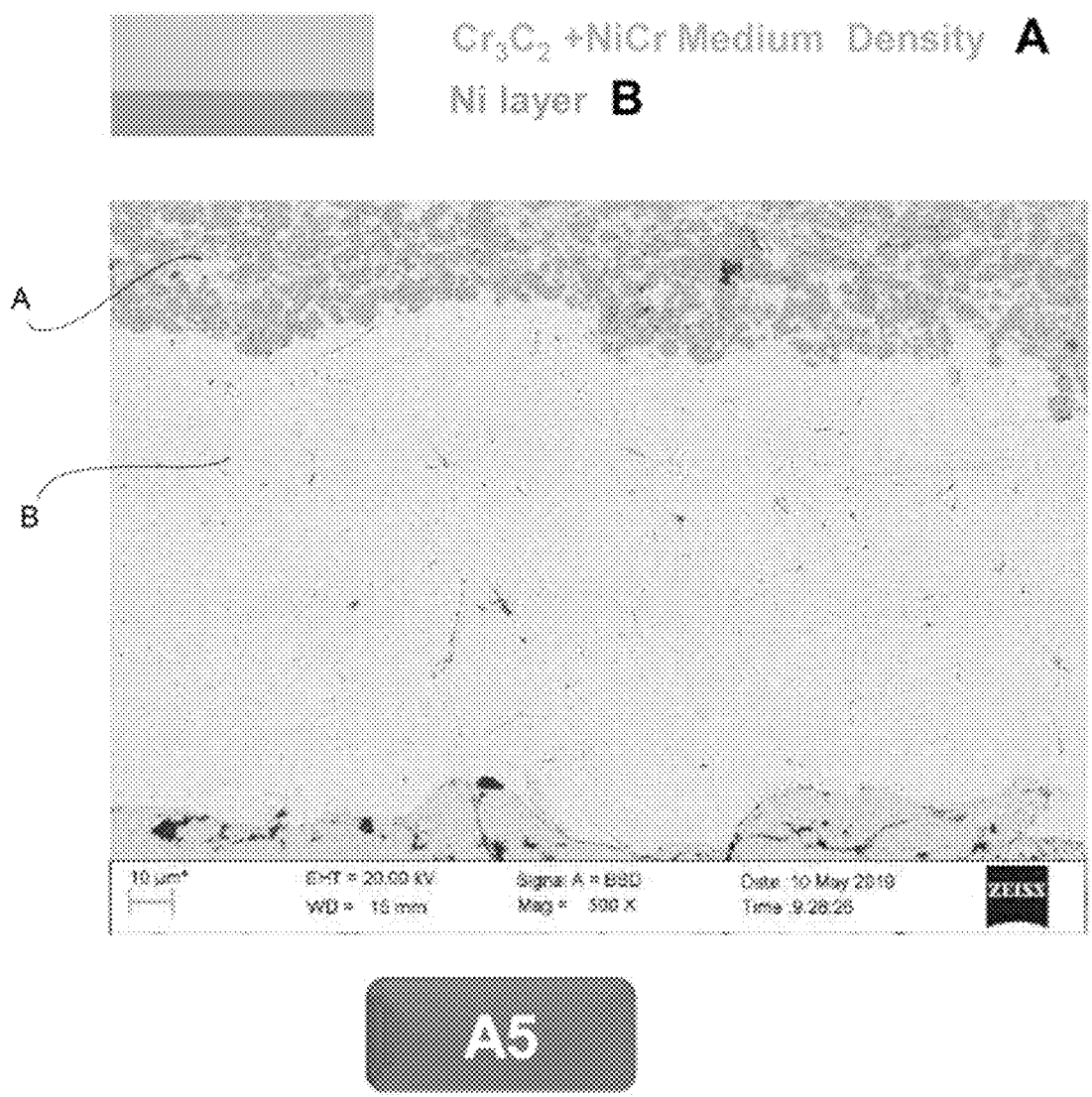
Figure 11B:
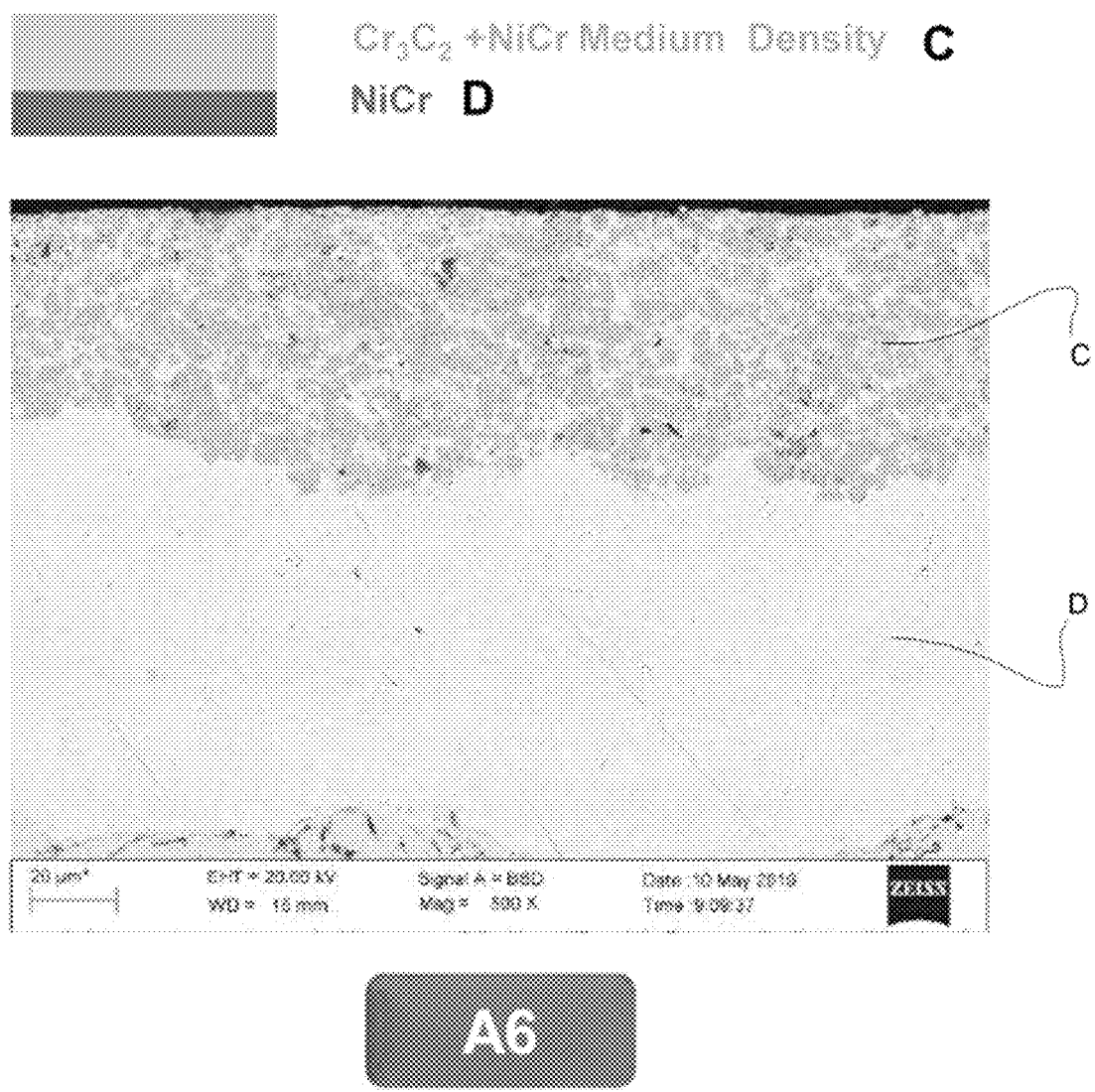

In some embodiments of the present disclosure, anti-wear and anti-corrosion coatings for brake discs are provided. In particular, in some embodiments of the disclosure, methods for the simultaneous reduction of the wear of both the brake discs and the associated brake pads are provided. Furthermore, in some embodiments of the disclosure, methods for reducing the likelihood of the occurrence of corrosive phenomena of any type of the disc are provided. Moreover, in some embodiments of the disclosure, a brake disc equipped with an anti-wear and anti-corrosion coating which involves a reduction in the wear of the brake pads compared to an uncoated brake disc and which, at the same time, involves an increase of resistance to the corrosive phenomena of any type of the disc itself are provided.

Some anti-wear coatings for brake discs cause an undesired prolongation of the "break-in" period of the brake disc, which goes from about 30 breakings for an uncoated cast iron disc, to over 120 breakings. During the break-in period the friction coefficient can vary considerably, giving the driver of the vehicle a feeling of insecurity when braking. Some embodiments of the disclosure can be used to reduce or eliminate this break-in period. Furthermore, reduced wear of the brake discs can usually be accompanied by an undesired increase in the wear of the brake pads. Some embodiments of the disclosure can reduce or alleviate the wear on the brake pads.

The disclosure relates to the use of such anti-wear and anti-corrosion coatings and to a braking system. The braking system can include an element to be braked, which in some embodiments can include a brake disc or brake drum, such as made of cast iron or steel though the particular material is not limiting. The brake disc or brake drum can be covered at least in part with an anti-wear and anti-corrosion coating according to the disclosure. The system can further include at least one braking element, such as a brake pad or shoe, suitable for cooperating through friction with the element to be braked, in which the braking element has a friction layer or block intended to cooperate with the element to be braked made of any friction material that is free of asbestos and copper or its alloys. In some embodiments, the brake pad can be of the generically defined copper-free type (made in the LS-Low-Steel or NAO-Non-Asbestos Organic versions).

NAO materials are the Non-Asbestos Organics that usually are identified as the materials that has not Fe-based metals inside. The LS is identified also as a material without asbestos but with Fe-based metals inside like metal or powder iron or steel.

The components of the composition or crude mixture of the friction material to be coupled with the anti-wear coating according to the disclosure can be the components used in the friction materials. For example, they can include a fibrous material of inorganic and/or organic and/or metal fibers, with the exception of asbestos, a binder, a filler or charge ("filler"), one or more lubricants or friction modifiers, or one or more abrasives.

In certain implementations, the fibers may include any organic fiber or inorganic fiber other than asbestos, or else any metallic fiber that is commonly used in friction materials. Illustrative non-limiting examples include inorganic fibers such as fiberglass, rock wool, wollastonite, sepiolite and attapulgite, and organic fibers such as carbon fibers, aramid fibers, polyimide fibers, polyamide fibers, phenolic fibers, cellulose and acrylic fibers or PAN (Poly-Acryl-Nitrile). Metallic fibers such as, for example, steel fibers, stainless steel, aluminum fibers, zinc, metal alloys like iron-tin can be used as well.

The fibers can be used in the form of either short fibers or powder, and the particular size is not limiting.

The quantity of fibers can be selected in order to ensure sufficient mechanical resistance. In some implementations, the quantity of fibers is preferably between 1% and 50% in volume compared to the total volume of the friction material. In some embodiments, the quantity of fibers is between about 8% and about 30% in volume.

According to the disclosure, an organic or inorganic filler or charge can be used as a raw component in some embodiments.

Numerous materials can be used as organic or inorganic charges. Illustrative examples, but not limited thereto, include calcium carbonate precipitate, barium sulfate, magnesium oxide, calcium hydroxide, calcium fluoride, slaked lime, talc, mica and vermiculite.

These compounds may be used by themselves or in combinations of two or more. The quantity of such charges can be between about 1% and about 60% in volume based on the total composition of the friction material.

The organic binder can be any binder known and commonly used in friction materials and in general it is a thermosetting resin or a mixture of thermosetting resins.

Illustrative examples, but not limited thereto, of suitable binders include phenolic resins, melamine resins, epoxy resins, various modified phenolic resins such as epoxy-modified phenolic resins, oil-modified phenolic resins, alkylbenzene-modified phenolic resins.

Any one or combinations of one or more of these compounds can be used. In order to ensure sufficient mechanical resistance and wear resistance, the binder can be included in an amount of between about 2% to about 50% by volume based upon the total composition of the raw mixture or the final friction material obtained.

The friction modifier (which may include all or part of the filler or charge) may be an organic charge, such as cashew nut powder, rubber powder (pulverized tread rubber powder), a variety of non-vulcanized rubber particles, a variety of vulcanized rubber particles, an inorganic charge, such as barium sulfate, calcium carbonate, a calcium hydroxide, vermiculite and/or mica, an abrasive, such as silicon carbide, alumina, a zirconium silicate, a lubricant, such as molybdenum disulfide, a sulfide of tin, a zinc sulfide, iron and non-ferrous sulfides, metallic particles other than copper and copper alloys, and/or a combination of all of the above.

The abrasives that can be used in the present disclosure can be classified as follows (the following list is only indicative, not necessarily exhaustive and non-limiting):

Mild abrasives (Mohs 1-3): talc, calcium hydroxide, potassium titanate, mica, kaolin;

Medium abrasives (Mohs 4-6): barium sulfate, magnesium oxide, calcium fluoride, calcium carbonate, wollastonite, calcium silicate, iron oxide, silica, chromite, zinc oxide;

Strong abrasives (Mohs 7-9): silicon carbide, zirconium sand, zirconium silicate, zirconia, corundum, alumina, mullite.

The content of the friction modifier, according to the desired friction characteristics, can be between about 10% and about 80% in volume compared to the volume of the entire material.

The friction material components used according to the disclosure are generally as follows:
binders
fillers
lubricants/friction modifiers
abrasives (which may form part of the fillers)
fibers (inorganic/organic/metallic)
any metal powders However, it is understood that one or more of any of the above elements can be removed as desired.

Brake pads made with the aforesaid friction materials are coupled/operatively associated with an anti-wear and anti-corrosion coating applied on at least one friction surface of the brake discs configured to cooperate in use with the brake pad. The coating is in the form of two or more coupled layers, a first surface layer plus a second intermediate layer between the surface layer and the cast iron forming the disc body.

The surface layer of the coating presents particles of chromium carbide ($Cr_3C_2$) dispersed in a metallic matrix consisting of a NiCr alloy. According to a feature of the present disclosure, the surface coating layer is deposited on an intermediate layer previously (or simultaneously) deposited on the surface of the disc. The intermediate layer can include one or more of the following materials: chromium carbide particles ($Cr_3C_2$) dispersed in a metallic matrix consisting of a high density NiCr alloy, e.g. applied with the HVOF technique, an $Ni_5Al$ alloy applied with a deposition system of it, such as through the HVOF technique; Cr—Ni austenitic steel and such as a FeNiCrMoSiC alloy applied with a deposition system of it through the HVOF technique; Ni applied with a galvanic deposition system; Ni applied with a deposition system of the it through the HVOF technique; NiCr alloy applied with a deposition system of it through the HVOF technique; or any combination of the above.

Here and hereinafter for a "high-density layer" it is intended the layer of chromium carbide particles ($Cr_3C_2$) dispersed in the metallic matrix consisting of a NiCr alloy having Hv hardnesses between 800 and 1000. Instead, the surface layer having particles of chromium carbide ($Cr_3C_2$) dispersed in the metallic matrix of a medium density NiCr alloy has a hardness Hv (Vickers) between 600 and 800.

The austenitic steel layer can have a variable chemical composition within the following limits: $35<Fe<88$; $10<Cr<35$; $2<Ni<18$ (ratio based on weight percentage) In some embodiments, there can be a prevalence of Cr over Ni.

In some embodiment, the layer can also contain molybdenum, such as or from about 1.5% to about 18% in weight. The layer can further include other alloying elements in smaller percentages, such as Si, Mn, B, W, V, C, Cu, Co, Nb, which however, are added in a total quantity that is lower than the sum of the Fe, Cr and Ni content. In some embodiments, the layer can be made of FeNiCrMoSiC (iron-nickel-chromium-molybdenum-silicon-carbon) alloys, e.g., as that known under the trade name of Diamalloy®.

In some embodiments the austenitic steel layer can have the following chemical composition:

| Product (Diammalloy®) | Fe % w | Cr % w | Mo % w | Ni % w | Si % w | B % w | Cu % w | C % w |
|---|---|---|---|---|---|---|---|---|
| 1008 | balance | 18 | 12 | 4 | 3.5 | 3 | 2.5 | 0.6 |
| 1009 | balance | 33 |  | 8 |  | 4.8 |  | 0.6 |
| 1010 | balance | 28 | 4.5 | 16 | 1.5 |  |  | 1.75 |

In some embodiments the coatings including metallic particles of chromium carbide (Cr3C2) dispersed within a metallic matrix of an alloy of NiCr has a composition of up to 75% w of chromium carbide the balance being the NiCr alloy at 20 or 25% w of Cr.

The aforementioned anti-wear and anti-corrosion coatings can be applied by thermal spray, such as using HVOF technology, possibly with the exception of metallic Ni, and the carbide particles in the metallic matrices are, according to a further aspect of the disclosure, spheroidal in form. However, other applications can be used as well, e.g. Plasma Spray, Laser Cladding, Cold Laser Deposition, Laser Spray Deposition; and the carbides can be in non-spheroidal form.

The anti-wear coatings according to the disclosure can have an overall thickness between 20 and 400 micrometers and, after carrying out a thermal spray and grinding, they have a surface roughness between 0.05 and 2.0 micrometers.

The use of these selected materials for brake pads and for the anti-wear coating of brake discs allows a method to be implemented for the simultaneous reduction of the wear of a brake disc and associated brake pads. The method can comprise one or more of the following:

preparing brake pads, such as by using a copper-free (Low Steel or Non-Asbestos Organic) type friction material formulation;

coating at least one friction surface of a brake disc intended to cooperate in use with a brake pad with an anti-wear coating formed by two coupled layers. This includes a first surface, i.e. outer, layer, i.e. further away from the surface to be covered, consisting of chromium carbide particles (Cr3C2) dispersed in a metallic matrix of a NiCr alloy. The coating further includes a second intermediate layer, i.e. placed between the first layer and the surface to be covered, formed out of a material chosen in the group of: chromium carbide particles (Cr3C2) dispersed in a metallic matrix of a high density NiCr alloy, such as applied with the HVOF technique, a Ni5Al alloy, such as applied with a deposition system for it via the HVOF technique; a Cr—Ni austenitic steel, such as a FeNiCrMoSiC alloy, for example applied with a deposition system for it via the HVOF technique; Ni applied with a galvanic deposition system; Ni applied with a deposition system for it via the HVOF technique; a NiCr alloy, such as applied with a deposition system for it via the HVOF technique, or any combination of the above.

Further, the method can include coupling together the previously prepared brake pads and the brake disc.

The anti-wear and anti-corrosion coating can be applied by using HVOF (High Velocity Oxygen Fuel) thermal spray technology, except for galvanic nickel. The deposition techniques as cited above have shown to allow a high compactness and low porosity to be obtained.

However, other application methods having equivalent effect could be used as well.

The brake pads can be made with a friction material belonging to the copper-free family (Low-Steel or Non-Asbestos Organic) and can be coupled with an anti-wear and anti-corrosion coating according to the disclosure, covering at least one friction surface of the brake disc.

A braking system can be implemented including an element to be braked, such as a brake disc (e.g., made of cast iron or steel) and at least one braking element, such as a brake shoe or pad, suitable for cooperating by friction with the element to be braked. The element to be braked can have at least one friction surface configured to cooperate with the braking element, which friction surface is at least partially covered with an anti-wear and anti-corrosion coating as previously described. The braking element can comprise at least one block of friction material configured to cooperate with the element to be braked. The friction material can be of the copper-free type (e.g., Low-Steel or Non-Asbestos Organic).

The examples and comparative examples are reported here by way of illustration and are not intended to limit the disclosure.

Example 1

A friction material is prepared, which is part of the generic LS (Low-Steel) category, according to the known composition currently in use, which is indicated in Table 1.

TABLE 1

| FAMILY | LS |
|---|---|
| COMPONENTS | % Vol |
| Fibers | 10 |
| Organic additives | 11 |
| Resin | 17 |
| Strong abrasive | 12 |
| Medium abrasive | 11 |
| Mild abrasive | 27 |
| Sulfides | 3 |
| Carbon | 9 |

In Table 1, for the mild, medium and strong abrasives, one or more materials were chosen as indicated below:

Mild abrasives (Mohs 1-3): talc, calcium hydroxide, potassium titanate, mica, kaolin Medium abrasives (Mohs 4-6): barium sulfate, magnesium oxide, calcium fluoride, calcium carbonate, wollastonite, calcium silicate, iron oxide, silica, chromite, zinc oxide Strong abrasives (Mohs 7-9): silicon carbide, zirconium sand, zirconium silicate, zirconia, corundum, alumina, mullite.

Example 2

The friction material according to Table 1 is molded onto identical metal substrates and cured, in order to form identical (or generally identical) brake pads.

In particular, the brake pad pressing was performed at a temperature between 60 and 200° C. at a pressure from 150 to 1800 kg/cm2 for a duration between 3 and 10 minutes or by preforming the mixing within a die and thereafter pressing at a temperature from 130 to 180° C. at a pressure from 150 to 500 kg/cm2 (14.7-49 MPa) for a duration of 3 to 10 minutes.

The resulting pressed article is typically post-cured by heat treatment from 150 to 400° C. for a duration between 5 minutes to 15 hours, it is then spray painted or powder-painted, kiln-dried and possibly machined where necessary to produce the final product.

The effective braking area of each single pad is about 52.6 cm2.

Example 3

A series of commercial brake discs for 18 inch castors in lamellar cast iron were obtained, all identical or generally identical, having the following general characteristics: diameter 356 mm; thickness (width along the axis of rotation) 28 mm; a disc is left with bare surfaces; the other brake discs are covered on both opposite faces, which are identified by the friction surfaces that are intended to cooperate in use with the brake pads, and which have anti-wear and anti-corrosion coatings, marked as A0 and from A1 to A6, and with compositions and characteristics as indicated in Table 2 (all values can be described as about X as well as the particular listed X value(s)). The brake discs can be fully or partially coated.

TABLE 2

|    | Chemical composition | Microhardness (HV) | Surface roughness after grinding (Ra, μm) |
|----|----|----|----|
| A0 | WC + Ni | 1000-1500<br>250-500 | 0.15-0.4 |
| A1 | $Cr_3C_2$—NiCr +<br>$Cr_3C_2$—NiCr | 500-1200<br>500-1200 | 0.15-0.4 |
| A2 | $Cr_3C_2$—NiCr +<br>$Ni_5Al$ | 500-1200<br>200-500 | 0.15-0.4 |
| A3 | $Cr_3C_2$—NiCr +<br>FeNiCrMoSiC | 500-1200<br>400-600 | 0.15-0.4 |
| A4 | $Cr_3C_2$—NiCr +<br>galv. Ni | 500-1200<br>300-600 | 0.15-0.4 |
| A5 | $Cr_3C_2$—NiCr +<br>Ni HVOF | 500-1200<br>300-500 | 0.15-0.4 |
| A6 | $Cr_3C_2$—NiCr +<br>NiCr | 500-1200<br>300-500 | 0.15-0.4 |

The coatings containing chromium carbide contain a quantity of chromium carbide up to about 75% in weight and for the remainder (e.g., up to 25% or up to about 25%) a Ni—Cr alloy. The Ni—Cr alloy can be from 20% to 25% chromium, which can also be the same alloy used for only NiCr coatings. In the present example a 75% chromium carbide and 25% NiCr alloy coating was used. The austenitic steel FeNiCrMoSiC coating has the following composition (weight percentages): 28% Cr-16% Ni-4.5% Mo-1.5% Si-1.75% C-balance Fe.

Table 2 coatings are in this example applied by spray, using HVOF (High Velocity Oxygen Fuel Spraying) technology except for the metallic nickel layer of the A4 material, applied by galvanic deposition. Other methods could be used as well if having the same final results.

In the HVOF process as utilized here, a mixture of gaseous or liquid fuel and oxygen is introduced in a combustion chamber, where they are burned continuously; the resulting hot gas, at a pressure close to 1 MPa, is emitted through a convergent-divergent nozzle and travels through a straight section; the fuels can be gas (hydrogen, methane, propane, propylene, acetylene, natural gas, etc.) or liquids (kerosene, etc.); the speed of the jet at the exit of the tube (>1000 m/s) exceeds the speed of sound. The A1-A6 powder materials are injected into the gas stream from time to time, which accelerates the powder up to 800 m/s and the hot gas and dust stream is directed towards the surface to be coated; the powder partially dissolves in the gaseous flow and deposits on the substrate, providing a coating with low porosity and high force of adhesion.

After carrying out a thermal spray and subsequent grinding, the anti-wear and anti-corrosion coatings have a surface roughness which may vary from point to point but is anyway comprised between 0.1 and micrometers. In this example, the average thickness of the coatings is between 80 and 160 micrometers.

Example 4

Using the brake discs of Example 3 and the brake pads of Example 2, various fading tests were performed, using pads made of copper-free material. The results obtained are shown in FIGS. 1a to 6b, where the combinations used are indicated:

Bare cast iron (A): uncoated brake disc coupled with brake pads made with "Cu-free" friction material;

A0: commercial coated brake disc coupled with brake pads made with "Cu-free" friction material;

A1: brake disc coated with A1 material coupled with brake pads made with "Cu-free" friction material;

A2: brake disc coated with A2 material coupled with brake pads made with "Cu-free" friction material.

A3: brake disc coated with A3 material coupled with brake pads made with "Cu-free" friction material.

A4: brake disc coated with A4 material coupled with brake pads made with "Cu-free" friction material.

A5: brake disc coated with A5 material coupled with brake pads made with "Cu-free" friction material.

A6: brake disc coated with A6 material coupled with brake pads made with "Cu-free" friction material.

The wear of both the brake disc and the brake pads used in each test is also evaluated at the end of each test. The results are given in Table 3 (all values can be described as about X as well as the particular listed X value(s)).

TABLE 3

| DISC | PAD WEAR | DISC WEAR |
|----|----|----|
| A | 1.0 mm | 7.5 g |
| A0 | 0.58 mm | 2.5 g |
| A1 | 0.46 mm | 6.3 g |
| A2 | 0.64 mm | 6.0 g |
| A3 | 0.79 mm | 6.8 g |
| A4 | 0.69 mm | 7.2 g |
| A5 | 0.72 mm | 4.2 g |
| A6 | 0.90 mm | 7.0 g |

Discussion of Results

As is evident from what has been described so far, the A1-A6 materials used for the coatings are all new in the field of anti-wear and anti-corrosion coatings for brake discs. In fact, the material constituting the surface layer of the coating, based on chromium carbides dispersed in a metallic matrix consisting of a nickel-chromium alloy, is superimposed on a second layer of protective material for cast iron, consisting of the described selection of metallic materials, chosen from the group consisting of: Cr3C2-high density NiCr, Ni5Al alloys, FeNiCrMoSiC alloys, metallic Nickel obtained by galvanic deposition; Ni applied with a deposition system of it through HVOF technique; NiCr alloy applied with a deposition system of it through HVOF technique; any combination of the above.

From the comparison of the graphs derivable through the fading test (FIGS. 1a-8b), the better braking behavior of the brake discs coated with all six A1-A6 materials compared to the bare cast iron becomes evident. Furthermore, for all the coatings in A1-A6 materials there is good maintenance of the friction coefficient during the following braking, which is highlighted by the blue (lighter grey) line in the graph on the left in FIGS. 1a-8b. In particular, the change of the friction coefficient during the series of subsequent braking shows a behavior that is better than, or comparable with, that obtainable with uncoated cast iron discs.

By observing the wear data reported in table 3, it is found that, given wear values (measured in grams of disc weight loss and loss of millimeters of the pad at the end of the fading test with respect to the initial situation) of the brake pads made with the friction compound of the Copper-free type and of the bare cast iron disc, when coupled together, of 7.5 g and 1.0 mm respectively, all the brake discs fitted with wear-resistant A1-A6 coatings have a lower wear (only 4.2 to 7.0 g) than the one in bare cast iron (7.5 g), in addition the brake pads show lower wear (from 0.46 to 0.90 mm) than that of the pad coupled to the bare cast iron disc (1.0 mm).

The surface micrographs of FIGS. 9a-11b allow the anti-wear and anti-corrosion coatings to be characterized. As is evident from the image for the A1 disc, the carbide particles included in the metallic matrices have a spheroidal form (e.g., due to the HVOF spraying technology). Furthermore, it can be observed the characteristic composite matrix of material A1 (FIG. 9b) and the irregular distribution of the carbides in the material. This chromium carbide matrix constitutes the outer surface layer of the coatings of the disclosure A1-A6.

In the commercial disc A0 a surface layer of tungsten carbide (A) is observed, which is deposited on an intermediate layer of nickel (B) to protect the cast iron. In the A1 material, the coating consists exclusively of Cr3C2 particles in a NiCr matrix and shows the greater porosity of the surface layer (C) characterized by the presence of diffuse dark areas in comparison with the underlying high density layer (D).

In the A2 material, the surface layer (E) of Cr3C2 in a NiCr matrix is deposited on a layer (F) of Ni5Al, which is of a lighter color, to protect the cast iron.

In material A3 (FIG. 10a), the surface layer of Cr3C2 in a NiCr matrix (A) is deposited on a layer of FeNiCrMoSiC alloy (B), which is of a lighter color, to protect the cast iron.

In the A4 material (FIG. 10b), the surface layer of Cr3C2 in a NiCr matrix (C) is deposited on a layer of galvanic nickel (D), which is of a lighter color, to protect the cast iron.

In the A5 material (FIG. 11a), the surface layer of Cr3C2 in a NiCr matrix (A) is deposited on a layer of metallic nickel (B), which is of a lighter color, and obtained with HVOF spraying to protect the cast iron.

In the A6 material (FIG. 11b), the surface layer of Cr3C2 in a NiCr matrix (C) is deposited on a layer of NiCr alloy (D), which is of a lighter color, obtained with HVOF spraying to protect the cast iron.

Figure 12:
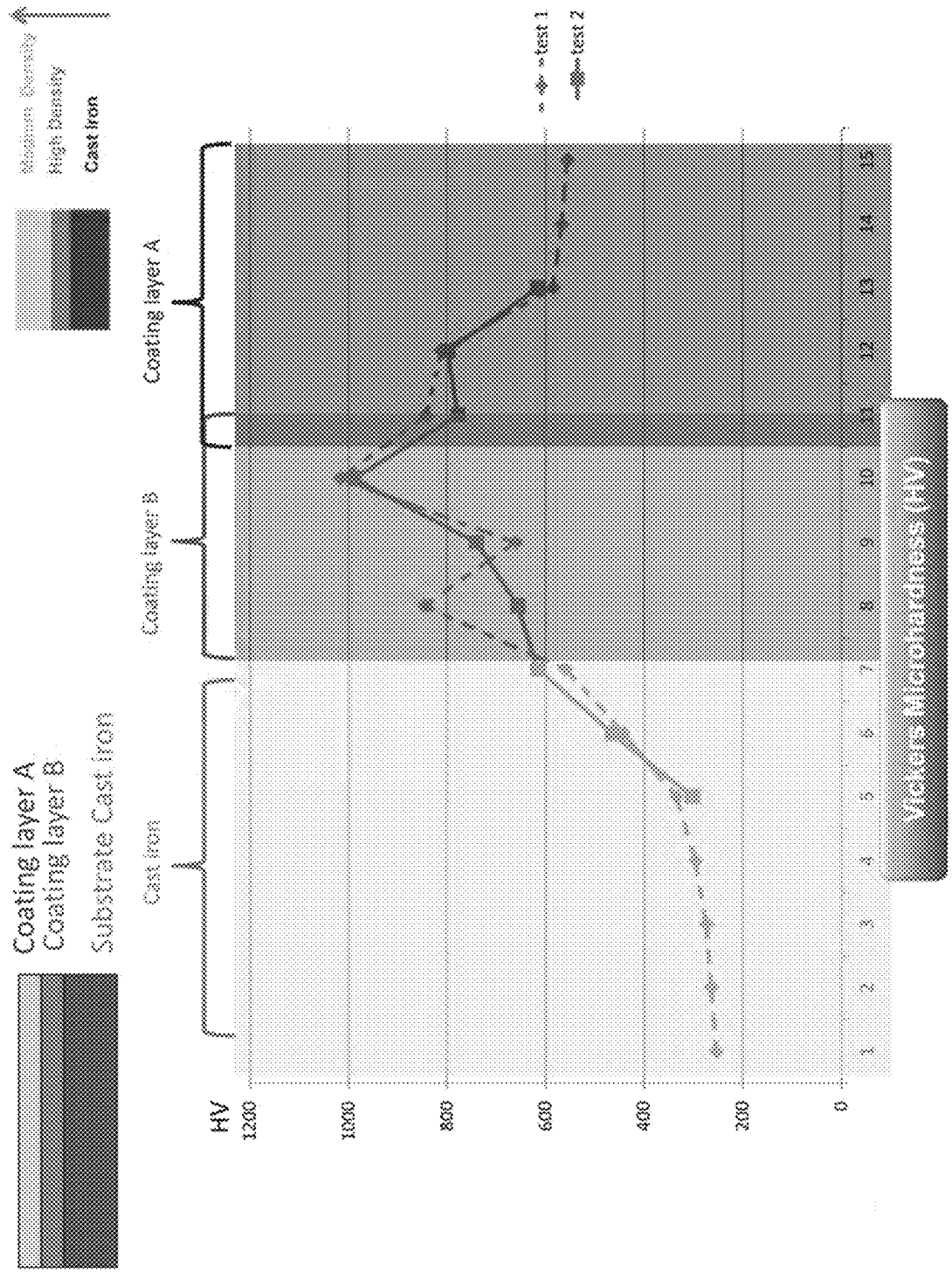
FIGS. 12 to 15 show the respective radial microhardnesses of the anti-wear and anti-corrosion coatings of the disclosure used to cover the brake discs used in the fading tests of the preceding figures.
Figure 13:
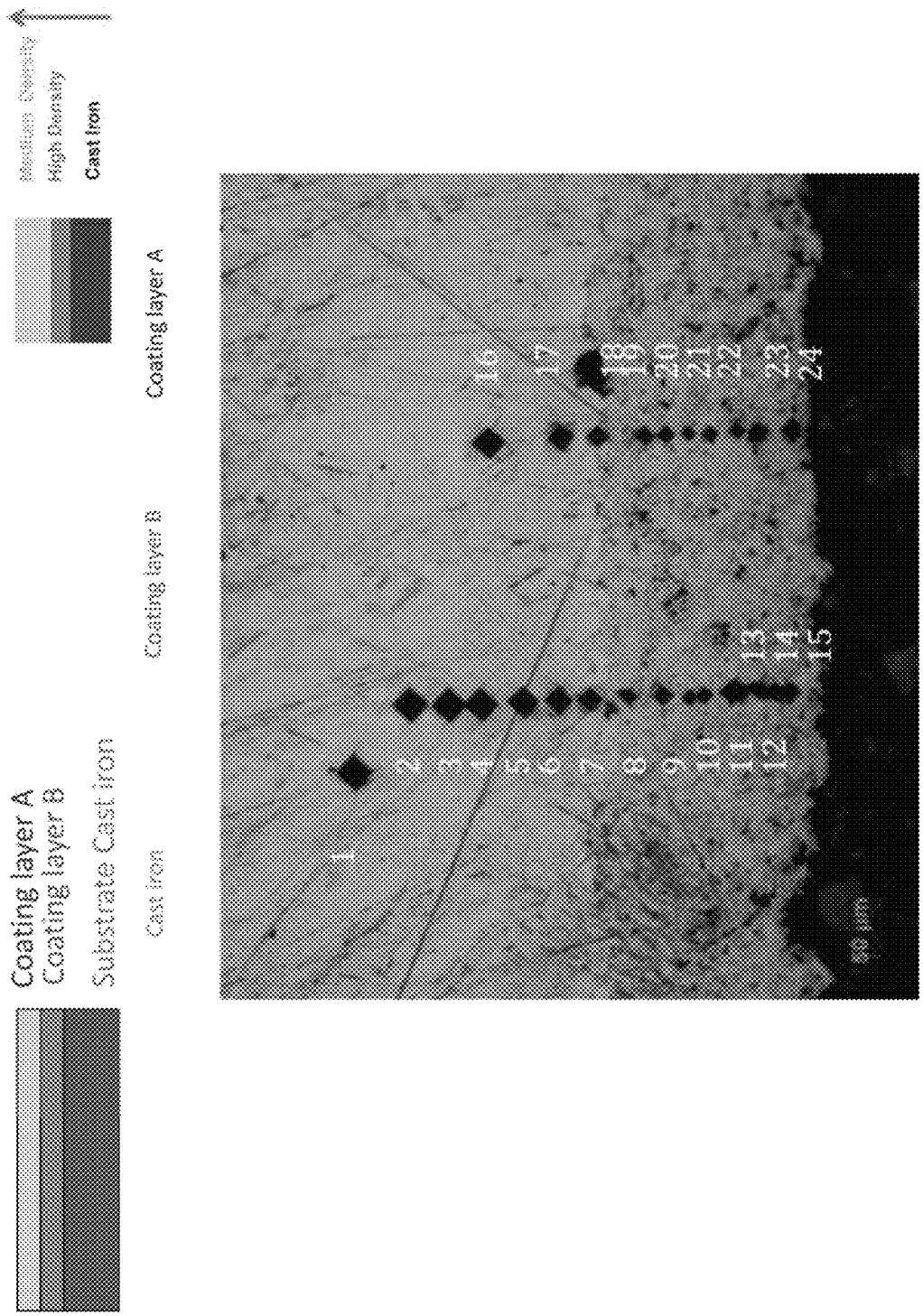
Figure 14:
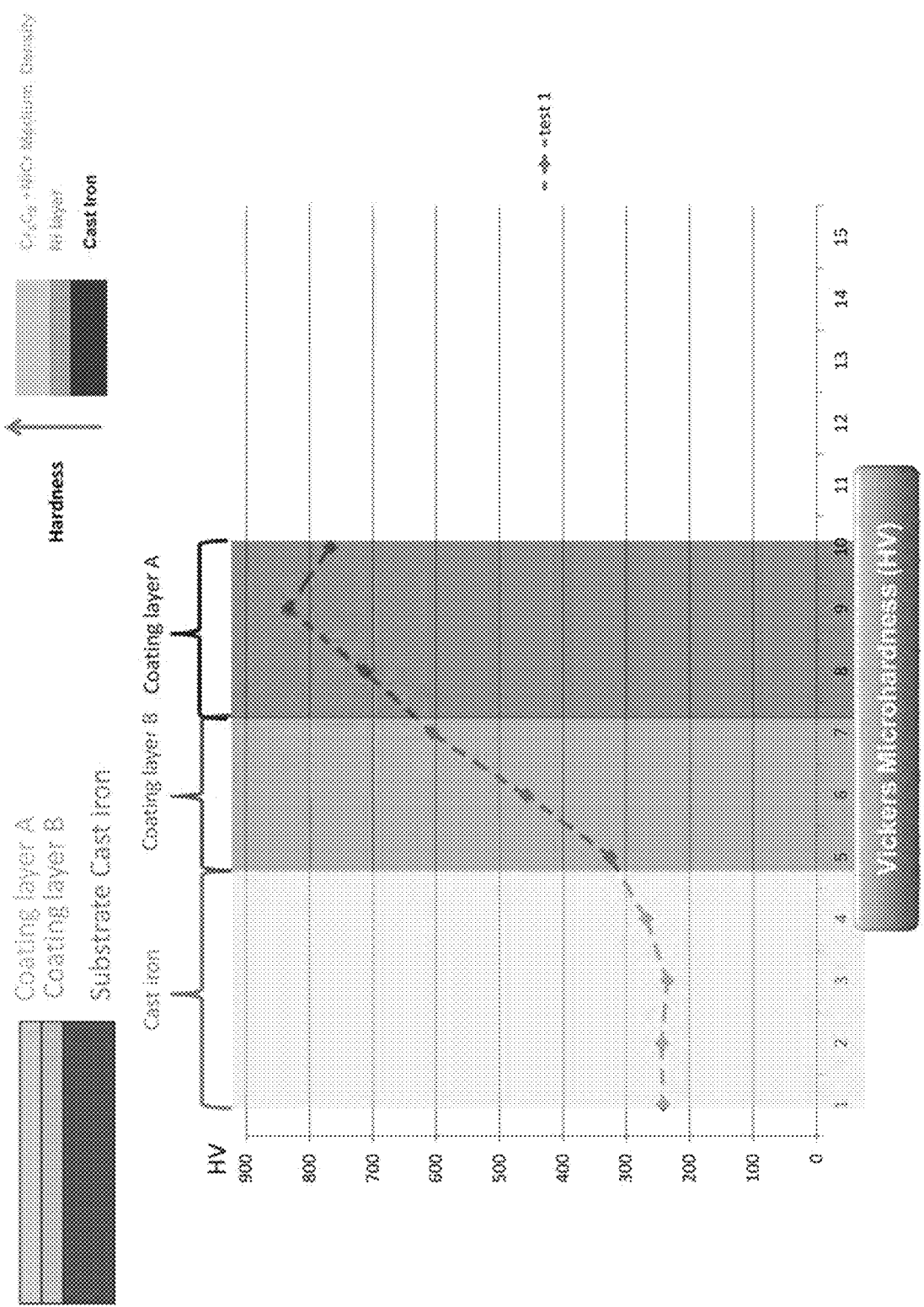
Figure 15:
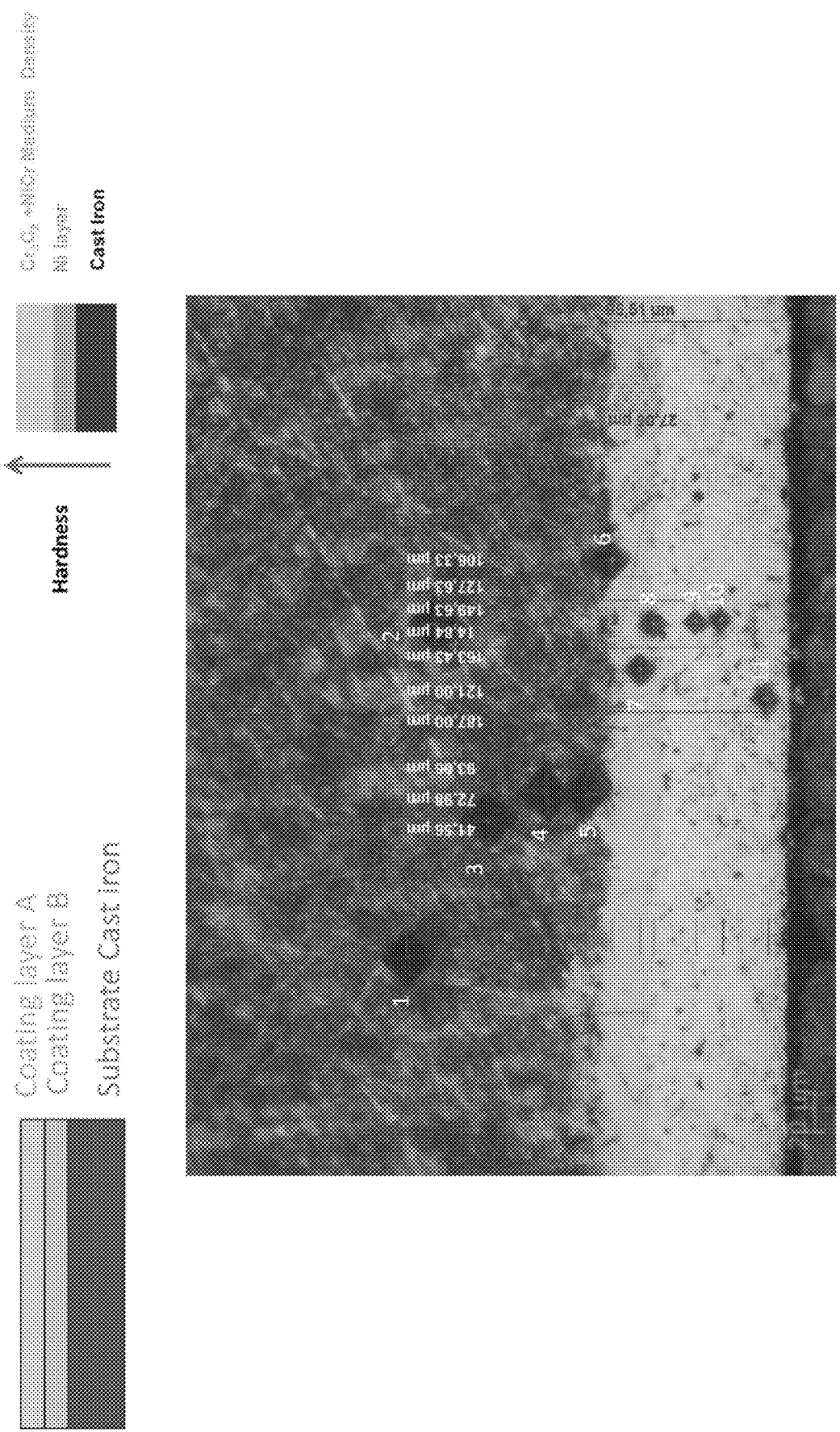

The protective coating layers are characterized by different mechanical properties, the measurement of microhardness through nano-indenters on the material section allows a description of the coating. By way of example, in FIGS. 12, 13 and 14, 15 the hardness profiles of the coatings present in discs A1 and A4 are shown. In the A1 case (FIG. 12, 13) of a double-density layer of Cr3C2 in a NiCr matrix, the different density of the deposited material is shown by the value of the hardness that initially grows from the 250 HV of the cast iron to about 800-about 1000 HV of the high density intermediate layer, followed by the lower density surface layer characterized by hardness in the range of 800-600 HV. Similarly, on the coating of the A4 disc (FIG. 14,15), a surface layer of Cr3C2 particles in a NiCr matrix is deposited on an intermediate layer of galvanic nickel to protect the cast iron. In this case, the hardness goes from 250 HV of cast iron to 300-600 HV of the nickel layer, to then grow further by passing to the surface layer of Cr3C2 600-800 HV.

Figure 16:
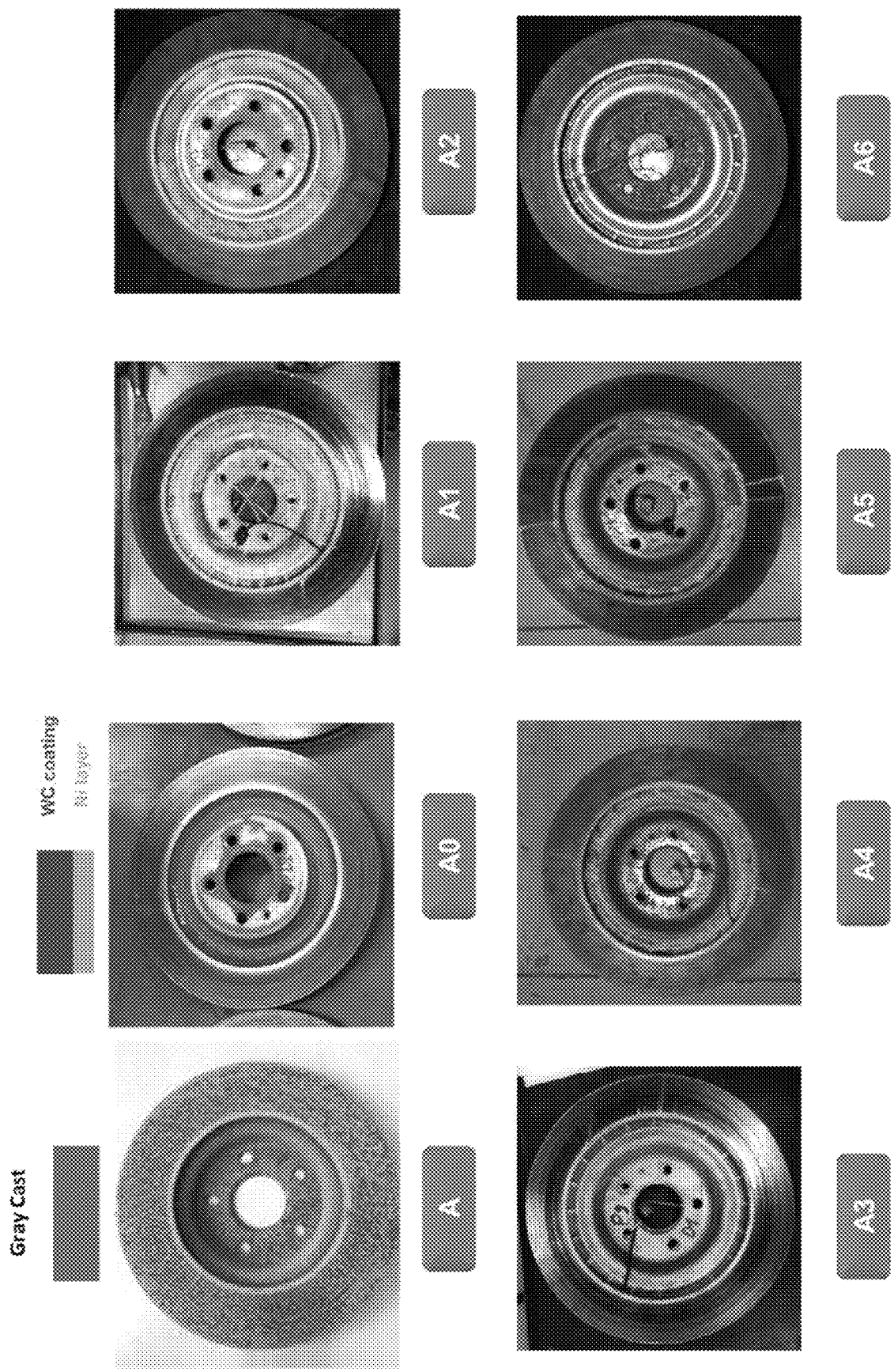
FIG. 16 shows the respective comparative photographs of the brake discs used in the fading tests of the preceding figures, after a test of resistance to corrosion in a climate chamber.
Figure 17B:
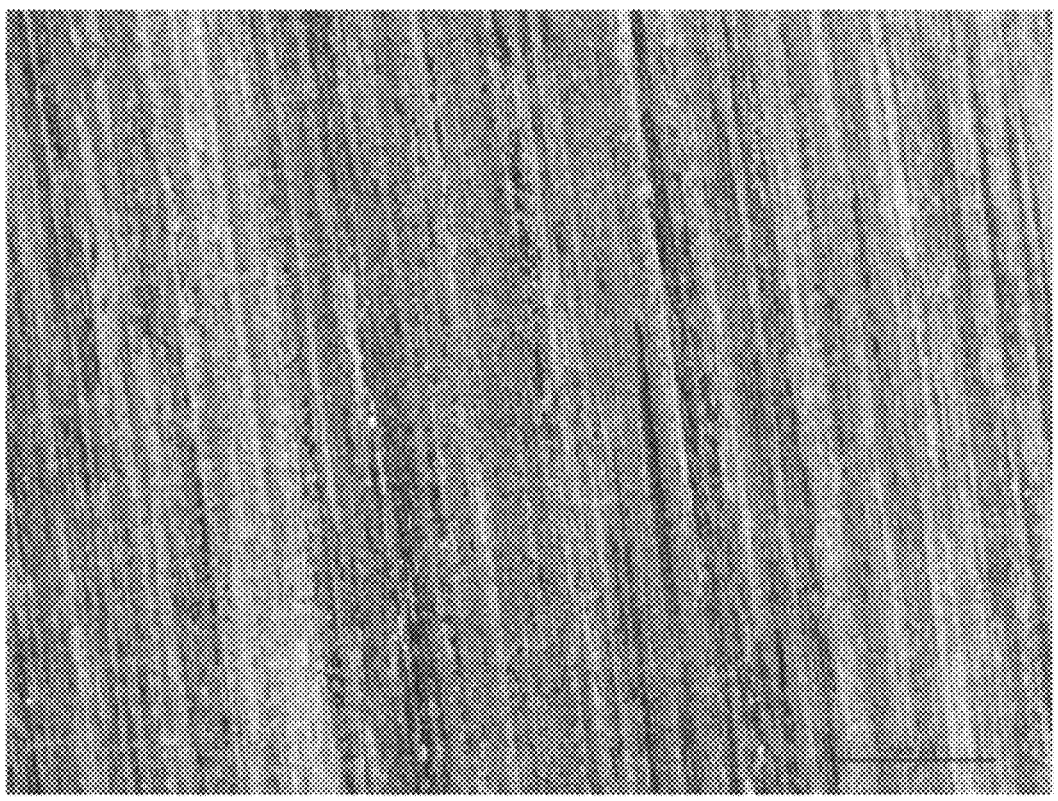
Figure 17C:
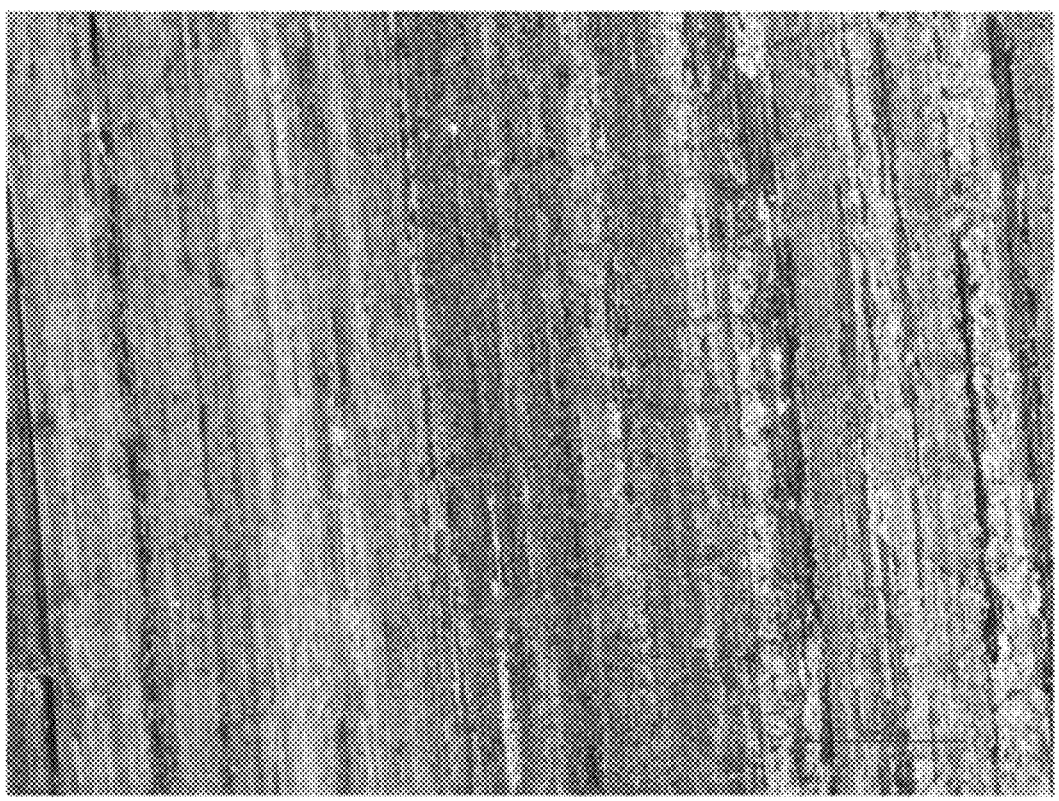
Figure 19B:
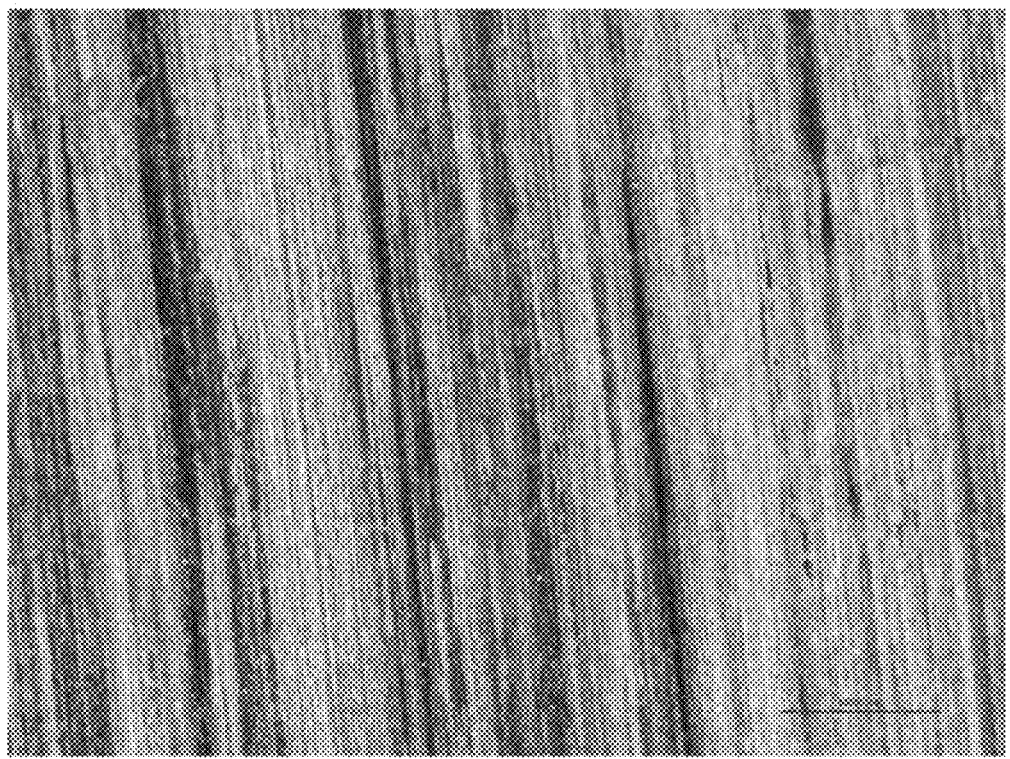
Figure 20:
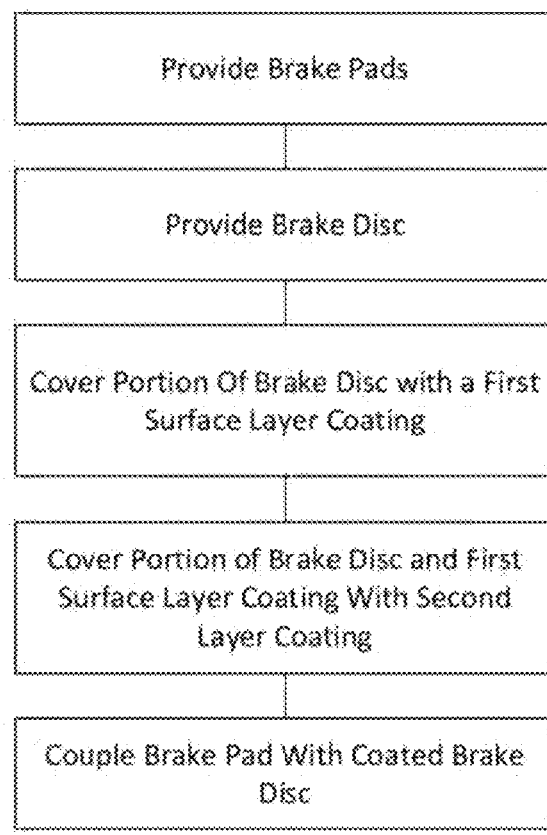
FIG. 20 shows an embodiment of a method of preparing a brake pad and brake disc system having an embodiment of the first and intermediate coatings as discussed herein. As discussed herein, embodiments of brake pads are prepared, and embodiments of brake discs are prepared. The discs are then at least partially coated with a first layer coating of the present disclosure. Following, the discs are then at least partially coated with a second layer coating. Once coated, the brake pad and coated brake discs can be coupled together.

FIG. 16 shows, by way of example, the result of an accelerated corrosion test which compares a type A cast iron disc with a coated disc according to the disclosure of type A1. The discs are subjected to a fading test and subsequently each one to 15 24-hour cycles in a climatic chamber with salt mist according to the Audi/Volkswagen PV 1210 standard. The images show how the cast iron disc is covered with a thick layer of oxidized material, while the disc coated with the A1 material has a significantly reduced level of track corrosion. The test thus demonstrates the importance of the coating under the disclosure due to the anti-corrosion property of the brake discs.

FIGS. 17a-19b show surface micrographs of the coated discs after the fading test. From these it is evident how the materials of some embodiments of the disclosure present a considerable reduction in the formation of superficial cracks, which is the potential reason for the premature wear of the materials and corrosive infiltrations. Furthermore, the chromium carbide surface coating has lower elastic modulus values (EiT) (derivable from the microhardness values and the depth of the indentation) that are lower than is generally shown by tungsten carbide covered discs ranging from 160 to 180, while tungsten carbide usually has elastic modulus values greater than 200.

CONCLUSIONS

All six novel layers of anti-wear and anti-corrosion material tested on the same brake discs not only allow the wear on the brake disc to be reduced, but also allow the wear of the tested brake pads to be reduced (this is likely valid for any family of compositions of friction material currently in use, given the general composition of the tested friction material) and, on the other hand, at the same time and quite surprisingly, allow good consistency of the friction coefficient to be obtained, this way solving the inconvenience of the need for a long "break-in".

Further, the accelerated corrosion test has demonstrated the effectiveness of the coatings of the disclosure in improving the anti-corrosion properties of cast-iron brake discs.

From the foregoing description, it will be appreciated that inventive coatings for brake discs and methods for reducing wear are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

All ranges shown include the upper and lower limits of the interval unless explicitly excluded.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

The invention claimed is:

1. An anti-wear and anti-corrosion coating for a brake disc comprising:
a first outermost surface layer; and
an intermediate second layer coupled to the first outermost surface layer, wherein
the intermediate second layer is arranged between the first outermost surface layer and a friction surface of the brake disc,
the first outermost surface layer comprises particles of chromium carbide (Cr3C2) dispersed within a metallic matrix comprising an NiCr alloy,
the first outermost surface layer is applied by means of thermal spray,
the intermediate second layer comprises an alloy of FeNiCrMoSiC (iron-nickel-chromium-molybdenum-silicon-carbon), and
the first outermost surface layer is deposited upon the intermediate second layer previously deposited upon the friction surface of the brake disc.

2. The anti-wear and anti-corrosion coating according to claim 1, wherein the brake disc is configured to cooperate in use with a braking element.

3. The anti-wear and anti-corrosion coating according to claim 1, wherein
the particles of chromium carbide (Cr3C2) are dispersed in spheroidal form, and
the first outermost surface layer is applied with a deposition system via HVOF (High Velocity Oxygen Fuel) thermal spray technique.

4. The anti-wear and anti-corrosion coating according to claim 1, wherein the anti-wear and anti-corrosion coating has a thickness between 20 and 400 micrometers.

5. The anti-wear and anti-corrosion coating according to claim 1, wherein
the anti-wear and anti-corrosion coating has, after coating and grinding, a surface roughness between 0.05 and 1.0 micrometers, and
the first outermost surface layer and/or the intermediate second layer are applied with a deposition system via HVOF thermal spray technique.

6. A vehicle brake system comprising:
an element to be braked, the element to be braked comprising a brake disc or a drum made from cast iron or steel; and
at least one braking element comprising a brake shoe or a pad, suitable for cooperating by friction with the element to be braked, the element to be braked having at least one friction surface configured to cooperate with the at least one braking element and the at least one friction surface covered with an anti-wear and anti-corrosion coating, wherein
the anti-wear and anti-corrosion coating comprises a first outermost surface layer and an intermediate second layer coupled to the first outermost surface layer,
the intermediate second layer is arranged between the first outermost surface layer and a friction surface of the element to be braked,
the first outermost surface layer comprises particles of chromium carbide (Cr3C2) dispersed within a metallic matrix comprising an NiCr alloy, and
the intermediate second layer comprises an alloy of FeNiCrMoSiC (iron-nickel-chromium-molybdenum-silicon-carbon).

7. The vehicle brake system according to claim 6, wherein
the first outermost surface layer is applied by means of thermal spray, and
the first outermost surface layer is deposited upon the intermediate second layer previously deposited upon the friction surface of the element to be braked.

8. The vehicle brake system according to claim 6, wherein
the particles of chromium carbide (Cr3C2) are dispersed in spheroidal form, and
the first outermost surface layer is applied with a deposition system via HVOF (High Velocity Oxygen Fuel) thermal spray technique.

9. The vehicle brake system according to claim 6, wherein the anti-wear and anti-corrosion coating has a thickness between 20 and 400 micrometers.

10. The vehicle brake system according to claim 6, wherein
the anti-wear and anti-corrosion coating has, after coating and grinding, a surface roughness between 0.05 and 1.0 micrometers, and
the first outermost surface layer and/or the intermediate second layer are applied with a deposition system via HVOF thermal spray technique.

11. The vehicle brake system according to claim 6, wherein the braking element comprises at least one friction material block configured to cooperate with the element to be braked, the friction material being of the copper free type (Low Steel or Non-Asbestos Organic).

12. A method for the simultaneous reduction in wear of a brake disc and associated brake pads, the method comprising:
preparing one or more brake pads using an LS (Low Steel) or NAO (Non Asbestos Organics) type friction material formulation;
covering at least one friction surface of a brake disc intended to cooperate in use with a brake pad with an anti-wear and anti-corrosion coating comprising a first surface layer of particles of chromium carbide (Cr3C2) dispersed within a metallic matrix consisting of a NiCr alloy and an intermediate second layer coupled to the first surface layer comprising an alloy of FeNiCrMoSiC (iron-nickel-chromium-molybdenum-silicon-carbon); and
coupling together the prepared one or more brake pads and the brake disc.

13. The method according to claim 12, wherein the anti-wear and anti-corrosion coating is applied by means of the HVOF (High Velocity Oxygen Fuel) thermal spray technology.

14. The method according to claim 12, wherein the intermediate second layer is applied by HVOF thermal spray or by galvanic means.

15. The method according to claim 12, wherein the one or more brake pads manufactured with a friction material belonging to the copper-free family (Low-Steel or Non-Asbestos Organic) are coupled together with the anti-wear and anti-corrosion coating coated on at least one friction surface of the brake disc.

* * * * *